US012093247B2

(12) United States Patent
Gramoli et al.

(10) Patent No.: US 12,093,247 B2
(45) Date of Patent: Sep. 17, 2024

(54) BLOCKCHAIN SYSTEM AND METHOD

(71) Applicants:Commonwealth Scientific and Industrial Research Organisation, Acton (AU); University of Sydney, Sydney (AU)

(72) Inventors: Vincent Gramoli, Maroubra (AU); Tyler Crain, Sydney (AU); Christopher Natoli, Sydney (AU); Guillaume Vizier, Acton (AU)

(73) Assignee: REDBELLY BLOCKCHAIN HOLDINGS PTY LTD (AU)

( * ) Notice: Subject to any disclaimer, the term of this patent is extended or adjusted under 35 U.S.C. 154(b) by 717 days.

(21) Appl. No.: 17/253,647

(22) PCT Filed: Jun. 25, 2018

(86) PCT No.: PCT/AU2018/050642
§ 371 (c)(1),
(2) Date: Dec. 18, 2020

(87) PCT Pub. No.: WO2020/000011
PCT Pub. Date: Jan. 2, 2020

(65) Prior Publication Data
US 2021/0256016 A1    Aug. 19, 2021

(51) Int. Cl.
G06F 16/23    (2019.01)
G06Q 20/06    (2012.01)
(Continued)

(52) U.S. Cl.
CPC ...... *G06F 16/2379* (2019.01); *G06F 16/2365* (2019.01); *G06Q 20/389* (2013.01);
(Continued)

(58) Field of Classification Search
CPC ............ G06F 16/2379; G06F 16/2365; G06Q 20/389; G06Q 2220/00; G06Q 20/065;
(Continued)

(56) References Cited

U.S. PATENT DOCUMENTS

2014/0351129 A1    11/2014  Finot et al.
2017/0155515 A1     6/2017  Androulaki et al.
(Continued)

FOREIGN PATENT DOCUMENTS

WO        2018095540 A1    5/2018

OTHER PUBLICATIONS

Crain, T., et al., "DBFT: Efficient Byzantine Consensus with a Weak Coordinator and its Application to Consortium Blockchains" & Red Belly Blockchain (originally retrieved from internet on Aug. 15, 20018, last retrieved from internet on Mar. 16, 2021); https://web.archive.org/web/20171221082550/http://redbellyblockchain.io:90; published on Dec. 21, 2017 as per Wayback Engine.

*Primary Examiner* — Robert W Beausoliel, Jr.
*Assistant Examiner* — Mohammad S Bhuyan
(74) *Attorney, Agent, or Firm* — Barnes & Thornburg LLP; Jerry C. Harris, Jr.

(57)   ABSTRACT

A blockchain process executed by a proposer computing node, including the steps of generating proposed transaction data representing a set of proposed transactions from a group of transactions, where the proposed transactions are distinct from the proposed transactions of one or more other proposer nodes, transmitting the proposed transaction data to a predetermined number of associated verifier computing nodes to verify each of the proposed transactions, receiving, from at least one of the predetermined number of verifier computing nodes, verification data indicating a verification result of each proposed transaction, and generating block data to include one or more transactions of the group in a
(Continued)

blockchain data structure, the included transactions being verified ones of: the proposed transaction set of the proposer computing node; and the respective other proposed transaction sets of the other proposer nodes.

19 Claims, 20 Drawing Sheets

(51) Int. Cl.
    *G06Q 20/38*     (2012.01)
    *G06Q 20/40*     (2012.01)
    *H04L 9/00*     (2022.01)
    *H04L 9/32*     (2006.01)

(52) U.S. Cl.
    CPC .......... *H04L 9/3239* (2013.01); *H04L 9/3249* (2013.01); *H04L 9/50* (2022.05)

(58) Field of Classification Search
    CPC ... G06Q 20/401; H04L 9/3239; H04L 9/3249; H04L 9/50; H04L 9/3247
    See application file for complete search history.

(56) References Cited

U.S. PATENT DOCUMENTS

| | | |
|---|---|---|
| 2018/0095540 A1 | 4/2018 | Terao et al. |
| 2019/0018984 A1* | 1/2019 | Setty ..................... H04L 9/3239 |
| 2019/0097790 A1* | 3/2019 | Li ............................. H04L 9/12 |
| 2019/0188657 A1* | 6/2019 | Arora ............... G06Q 20/38215 |
| 2020/0162264 A1* | 5/2020 | Zamani ................. H04L 9/3297 |
| 2020/0401577 A1* | 12/2020 | Ohashi .................... G06F 21/64 |
| 2021/0243007 A1* | 8/2021 | Kramer ................. H04L 9/0643 |

\* cited by examiner

```
operation mv_propose(v_i) is
(01)    RB broadcast VAL(v_i);
(02)    repeat if (∃ k : (proposals_i[k] ≠ ⊥) ∧ (BIN_CONS[k].bin_propose() not invoked))
(03)            then invoke BIN_CONS[k].bin_propose(-1) end if;
(04)    until (∃ℓ : bin_decisions_i[ℓ] = 1) end repeat;
(05)    for each k such that BIN_CONS[k].bin_propose() not yet invoked
(06)            do invoke BIN_CONS[k].bin_propose(0) end for;
(07)    wait_until (⋀_(1≤x≤n) bin_decisions_i[x] ≠ ⊥);
(08)    j ← min{x such that bin_decisions_i[x] = 1};
(09)    wait_until (proposals_i[j] ≠ ⊥);
(10)    decide(proposals_i[j]).

(11) when VAL(v) is RB-delivered from p_j do
        if valid(v) then
            proposals_i[j] ← v;
            BV-deliver B-VAL[1](1) to BIN_CONS[j] end if.

(12) when BIN_CONS[k].bin_propose() decides a value b
        do bin_decisions_i[k] ← b.
```

Figure 5c

| | Tokyo | Seoul | Mumbai | Singa. | Sydney | Canada | Frankfurt | Ireland | London | São P. | N. Virg. | Ohio | N. Cal. | Oregon |
|---|---|---|---|---|---|---|---|---|---|---|---|---|---|---|
| Tokyo | 0 | 551 | 129 | 240 | 161 | 106 | 74 | 66.4 | 59 | 55.4 | 90.1 | 96.2 | 129 | 132 |
| Seoul | 33 | 0 | 137 | 157 | 141 | 91.5 | 54 | 60.8 | 54.7 | 56.6 | 84.2 | 114 | 84.2 | 116 |
| Mumbai | 133 | 164 | 0 | 121 | 67 | 90.9 | 176 | 178 | 145 | 46.7 | 81.9 | 80.5 | 69.1 | 64.2 |
| Singapore | 69 | 100 | 67 | 0 | 90.9 | 83.2 | 90.7 | 86.1 | 90.4 | 40.8 | 59.5 | 64.9 | 80.5 | 77.3 |
| Sydney | 106 | 135 | 235 | 170 | 0 | 77.1 | 61.3 | 53.8 | 51.2 | 40.2 | 74.9 | 99.7 | 135 | 119 |
| Canada | 166 | 185 | 196 | 220 | 225 | 0 | 166 | 250 | 164 | 159 | 808 | 760 | 205 | 168 |
| Frankfurt | 244 | 275 | 112 | 178 | 292 | 102 | 0 | 477 | 823 | 92.9 | 222 | 220 | 144 | 85.7 |
| Ireland | 266 | 246 | 122 | 188 | 286 | 78 | 25 | 0 | 829 | 114 | 185 | 183 | 104 | 117 |
| London | 255 | 284 | 111 | 179 | 281 | 90 | 15 | 12 | 0 | 107 | 190 | 195 | 107 | 85.5 |
| São P. | 271 | 293 | 302 | 328 | 332 | 125 | 210 | 184 | 192 | 0 | 131 | 124 | 77.7 | 81.7 |
| N. Virg. | 162 | 209 | 182 | 238 | 205 | 15 | 89 | 85 | 76 | 122 | 0 | 827 | 232 | 186 |
| Ohio | 169 | 199 | 193 | 227 | 196 | 25 | 99 | 91 | 87 | 131 | 13 | 0 | 428 | 219 |
| N. Cal | 120 | 150 | 262 | 178 | 148 | 76 | 148 | 142 | 138 | 182 | 64 | 52 | 0 | 681 |
| Oregon | 105 | 135 | 235 | 163 | 162 | 66 | 164 | 141 | 158 | 183 | 76 | 71 | 22 | 0 |

Figure 9

BLOCKCHAIN SYSTEM AND METHOD

CROSS REFERENCE TO RELATED APPLICATIONS

This application is a U.S. nationalization under 35 U.S.C. § 371 of International Application No. PCT/AU2018/050642, filed 25 Jun. 2018. The disclosure set forth in the referenced application is incorporated herein by reference in its entirety.

TECHNICAL FIELD

The present invention relates to blockchain technology, and in particular to a blockchain system and process.

BACKGROUND

Blockchains provide an effective means for tracking the ownership of digital assets within a distributed ledger. A blockchain data structure is typically implemented as list of records (or "blocks") that are linked and secured using cryptography. Each block contains a cryptographic hash of the previous block in addition to record data defining the block. Management of a blockchain structure involves generating and validating new blocks, and appending each newly generated block to the chain of existing blocks such that data is recorded in a verifiable and permanent way.

Due to their properties, blockchains are particularly well suited to recording transactions specifying an exchange of assets that has occurred between parties. Transactions are stored in batches within respective blocks of the data structure, thereby providing a permanent and readily accessible record of transaction activity. The security of a blockchain structure, and therefore its suitability as a mechanism for recording transactions, is dependent on the decentralised nature of the system that maintains and updates the data structure. Specifically, a blockchain transaction processing system includes a plurality of nodes in the form of geographically distributed computing devices that are configured to maintain a copy of the data structure, and to modify the structure by performing the processes of block generation and validation in a distributed way.

Conventional blockchain transaction processing systems aim at implementing a Byzantine fault-tolerant replicated state machine (RSM) by totally ordering blocks or sets of transactions that are issued by requesters. Specifically, the total ordering of transactions into blocks is achieved by the generation of new blocks containing transaction data, and a decision process by which each newly generated block is (or is not) added to the chain structure to commit (or reject) the transaction (i.e. the process of "deciding" the block). As a consequence of the distributed nature of the blockchain structure, transaction processing requires that consensus be reached between the nodes of the system to determine the form and structure of each new block (i.e. which transaction data to include). Permissionless blockchains allow any of the nodes of the system to be the deciders of new transaction blocks, while permissioned systems confine the decision making to a predetermined fixed set of nodes. The transaction data itself must also be verified as correct before being committed (i.e. added to the chain within a block) such that the integrity of the chain is maintained.

Various replicated state machines have been proposed to coordinate communication and processing activities between computing devices. However, these methods are typically designed for small scale distributed processing problems. By contrast, blockchains offer a distributed peer-to-peer information exchange and verification model where a large number of geo-distributed participants (i.e. nodes) replicate the information (i.e. transaction records), and where many requesters (or "clients") can issue operations with respect to the system, such as to issue cryptographically signed transactions for recordal.

Despite the convenience of these blockchain technologies, there remains room for improvement. It is desired to provide a blockchain system and process that alleviate one or more difficulties of the prior art, or to at least provide a useful alternative.

SUMMARY

In accordance with some embodiments of the present invention, there is provided a blockchain process executed by a proposer computing node, including the steps of:
generating proposed transaction data representing a set of proposed transactions from a group of transactions, where the proposed transactions are distinct from the proposed transactions of one or more other proposer nodes;
transmitting the proposed transaction data to a predetermined number of associated verifier computing nodes to verify each of the proposed transactions;
receiving, from at least one of the predetermined number of verifier computing nodes, verification data indicating a verification result of each proposed transaction; and
generating block data to include one or more transactions of the group in a blockchain data structure, the included transactions being verified ones of: the proposed transaction set of the proposer computing node; and the respective other proposed transaction sets of the other proposer nodes.

In some embodiments, the predetermined number of verifier computing nodes is at least t+1 and at most 2t+1, where t is the maximum number of faulty nodes in the network.

In some embodiments, the associated verifier computing nodes are determined dynamically based on the transactions to be processed by the network.

In some embodiments, the associated verifier computing nodes include a set of t+1 primary verifier nodes and a set of up to t secondary verifier nodes, the secondary verifier nodes providing redundancy against the failure of one or more of the verifier nodes.

In some embodiments, the set of secondary verifier computing nodes is disjoint from the one or more of the verifier nodes, and includes at least t nodes.

In some embodiments, the generation of the block data includes receiving, at the proposer node, data representing the verified transactions of the proposed transaction sets of each other proposer node in the network.

In some embodiments, the proposer node broadcasts data representing the verified transactions of its proposed transaction set to each other proposer node in the network.

In some embodiments, the verification of each proposed transaction involves checking a digital signature of the corresponding transaction data.

In some embodiments, the process of checking the digital signature of the transaction includes: extracting an encrypted representation of the digital signature; decrypting the representation to obtain a signature hash value; and comparing the signature hash value to a hash value calculated based on the transaction data.

In some embodiments, the proposer nodes are selected based, at least in part, on the geo-location of the node such that particular proposer nodes are likely to receive different sets of transactions from corresponding geo-regions.

In some embodiments, the generation of at least the proposed transaction data, and the block data, is performed according to a Byzantine Fault Tolerant (BFT) consensus protocol.

In some embodiments, the consensus protocol is a Democratic BFT (DBFT) protocol, such that the block data represents a decided transaction block that is determined by combining the proposed sets of transactions of all proposer nodes in the network.

In some embodiments, the decided transaction block includes transaction data representing a union of all verified transactions across all proposer nodes in the network.

In some embodiments, the DBFT is a weak co-ordinator based BFT protocol.

In some embodiments, the transactions are financial transactions, and the included transactions represented by the block data are valid transactions, the validity of each transaction being determined by a reconciliation process.

In some embodiments, the reconciliation process determines the validity of a financial transaction by checking whether the transaction is executable.

In accordance with some embodiments of the present invention, there is provided a blockchain system, including:
a plurality of computing nodes, each configured to act as at least one of a proposer node and a verifier node, and each of the computing nodes including:
at least one network interface to receive data from a communications network;
at least one processor; and
a memory coupled to the at least one computer processor and storing instructions that, when executed by the at least one processor, cause the at least one computer processor to execute a blockchain process,
wherein, if the node is configured to act as a proposer node, the blockchain process includes the steps of:
generating proposed transaction data representing a set of proposed transactions from a group of transactions, where the proposed transactions are distinct from the proposed transactions of one or more other proposer nodes of the system;
transmitting the proposed transaction data to a predetermined number of associated verifier nodes of the system for verification of each proposed transaction;
receiving, from at least one of the predetermined number of verifier computing nodes, verification data indicating a verification result of each proposed transaction; and
generating block data to include one or more transactions of the group in a blockchain data structure, the included transactions being the verified ones of: the proposed transaction set of the proposer node; and respective other proposed transaction sets of the other proposer nodes; and
wherein, if the node is configured to act as a verifier node, the blockchain process includes the steps of:
receiving, from a proposer node of the blockchain system, proposed transaction data representing a set of proposed transactions from a group of transactions, the proposed transactions being distinct from the proposed transactions of one or more other proposer nodes of the blockchain system;
generating verification data indicating a verification result of each proposed transaction;
transmitting the verification data to one or more associated nodes of the blockchain system, the associated nodes including the proposer node from which the proposed transaction data was received; and
generating block data to include one or more transactions of the group in a blockchain data structure, the included transactions being the verified ones of: the proposed transactions of the proposer node; and respective other proposed transactions of the other proposer nodes,
where the other proposed transactions are verified by nodes of the system other than the node and the one or more associated nodes.

In some embodiments, each of the plurality of nodes configured to act as a proposer node execute any one of the above processes.

In accordance with some embodiments of the present invention, there is provided a computer-readable storage medium having stored thereon instructions that, when executed by at least one processor of a computing system, cause the at least one processor to execute any one of the above processes.

BRIEF DESCRIPTION OF THE DRAWINGS

Some embodiments of the present invention are hereinafter described, by way of example only, with reference to the accompanying drawings, wherein:

FIG. 5c is a depiction of a WC-DBFT consensus algorithm implemented by the blockchain system

FIG. 9 is a table showing the results of an experimental evaluation of transaction verification as performed by an embodiment of the blockchain system;

DETAILED DESCRIPTION

Figure 1:
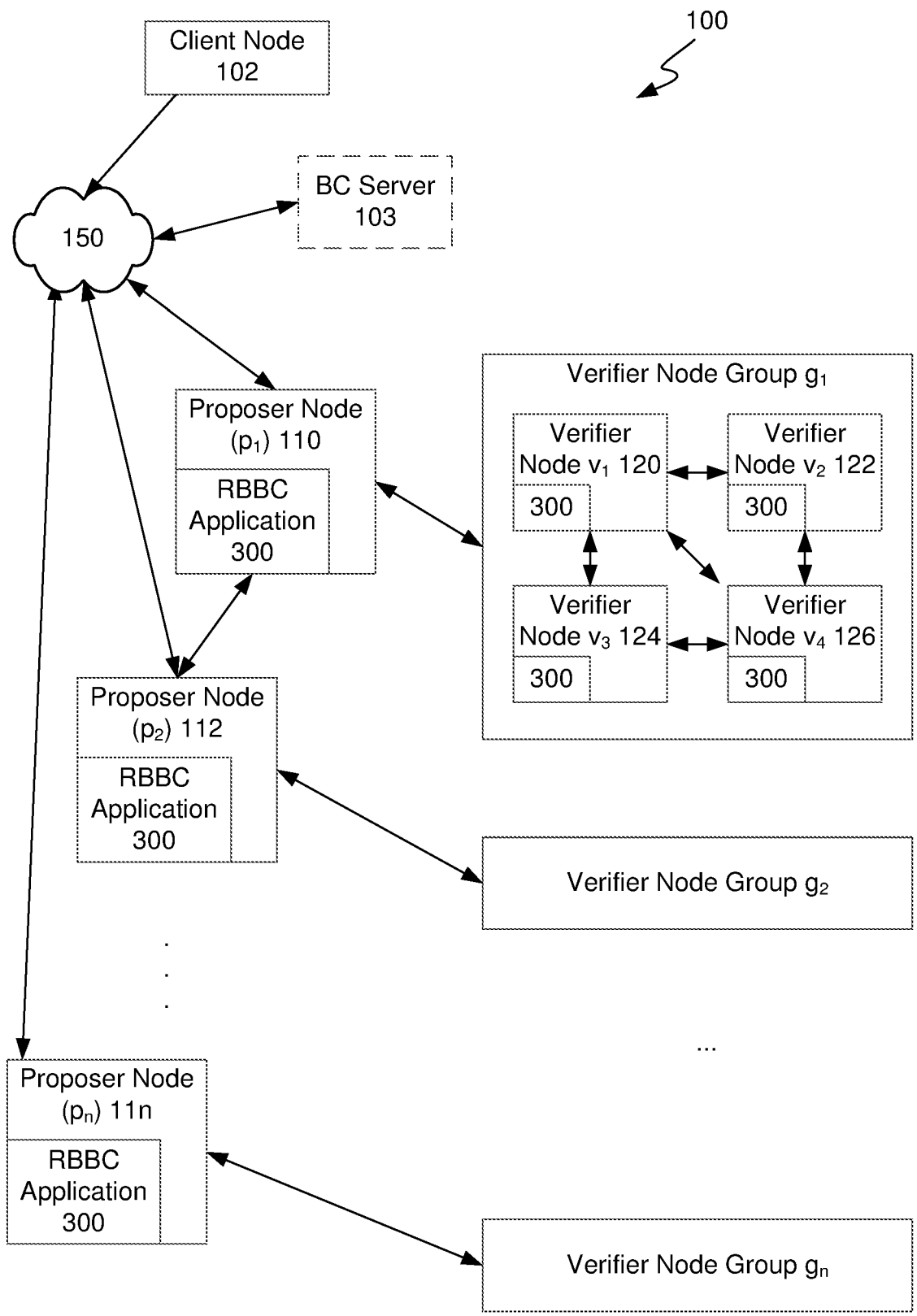
FIG. 1 is a block diagram of a blockchain system in accordance with some embodiments of the present invention.

The inventors have identified some shortcomings of presently existing blockchain systems and processes for transaction processing. In these systems, the consensus protocol controlling the generation of new blocks involves the broadcast of proposed new blocks from one node to all other nodes in the system. The nodes receiving the proposed block perform the verification of transactions included within the block. A limitation of existing blockchains, be they permissioned or permissionless, is therefore a trade-off between maintaining a high level of security and achieving efficient system performance. Specifically, a high level of security requires that the chain structure is highly distributed, however the computational demands of the verification and consensus operations are intense, and further increase with the degree of distribution (i.e. with the number of nodes in the network).

Furthermore, most permissioned blockchains achieve consensus by solving the classic Byzantine problem, thus requiring that the block decided is one of the blocks that were proposed. Asynchronous secure computation (ASC) and Interactive Consistency (IC) aim at deciding the combination of multiple proposals; however, they require a minimum of proposals to be combined. Unfortunately, blockchains cannot guarantee that a minimum of proposals contain valid transactions due, for example, to Byzantine requesters. Finally, the research results on scalable blockchains require synchrony, which exposes them to network attacks.

Furthermore, when implemented in conventional blockchain processing systems, known consensus protocols suffer from several drawbacks including: poor scalability (e.g. in Byzantine Fault Tolerance (BFT) where the number of messages required per consensus instance grows quadratically with the number of nodes); a need to restrict the decided value to one of the proposed values; and an assumption of synchrony (where if the messages experience an unforeseen delay, then the blockchain guarantees are violated).

The described embodiments of the present invention include A blockchain process executed by a proposer computing node, including the steps of:

generating proposed transaction data representing a set of proposed transactions from a group of transactions, where the proposed transactions are distinct from the proposed transactions of one or more other proposer nodes;

transmitting the proposed transaction data to a predetermined number of associated verifier computing nodes to verify each of the proposed transactions;

receiving, from at least one of the predetermined number of verifier computing nodes, verification data indicating a verification result of each proposed transaction; and generating block data to include one or more transactions of the group in a blockchain data structure, the included transactions being verified ones of: the proposed transaction set of the proposer computing node; and the respective other proposed transaction sets of the other proposer nodes.

That is, the improved blockchain system described herein, also referred to herein as the "Red Belly Blockchain" (RBBC) system, records transactions in a blockchain data structure via a sharded architecture in which one or more of the nodes are assigned functional roles such that they act as a proposer and/or a verifier. For a received set of transactions, each proposer node generates a proposed set of transactions that are verified by a corresponding predetermined number of the verifier nodes that are associated with the proposer. The proposed transaction sets generated by the proposer nodes are disjoint (i.e. there is no transaction overlap across the sets), and the number of verifier nodes associated with each proposer node is typically less than the number of total nodes in the system.

The segmentation (or sharding) of the transaction proposal and verification operations to proposer and corresponding verifier nodes offers several advantages over the current state-of-the art. First, the division of transactions into disjoint sets facilitates a consensus protocol in which the communication of verified transaction sets (or blocks) occurs between a reduced number of nodes (i.e. the proposer nodes). Conventional blockchain transaction processing systems typically use a competitive consensus protocol, such as Proof-of-Work, where a "winning" node is selected to broadcast their proposed block to all other nodes for verification, or a leader based Byzantine consensus protocol where leader controls new block creation by proposing a set of transactions. By contrast, the proposed RBBC implements a co-operative process between proposer nodes and their corresponding verifiers. Specifically, RBBC leverages the ability to combine distinct sets of transactions from multiple proposers to commit more transactions per consensus instance.

Second, as opposed to existing blockchains, where all nodes typically verify the same transactions, RBBC allows each transaction to be verified by a reduced number of nodes thereby reducing the computational demands of verification. This distribution or sharding of the consensus proposal and transaction verification operations reduces both the per transaction communication and the per node computation, thereby improving the efficiency of the system.

In the described embodiments, each proposer node is associated with a plurality of primary verifier nodes, such that each transaction is verified by at least t+1 nodes of the system (where t is the maximum number of faulty nodes in the system). In some embodiments, the proposer node may also act as a verifier node to perform verification operations on the transactions of its proposed set, or another proposed set. In other embodiments, the verification and transaction proposal operations are mutually exclusive and are performed by distinct nodes.

In some embodiments, each proposer node is also associated with a set of up to t secondary verifier nodes, where the secondary verifier nodes are different nodes to the primary verifiers. This provides redundancy against the failure of one or more of the verifier nodes during verification and ensures that each transaction is verified by at least t+1, and at most 2t+1, nodes of the system. To further improve redundancy, some embodiments assign a set of secondary proposer nodes to each proposer node that operate to propose the transactions assigned to the proposer node in case it is faulty.

To rapidly detect transaction conflicts, RBBC features the unspent transactions output (UTXO) model of the Bitcoin network. Each verifier node verifies transactions by checking the value of a digital signature included within the transaction data. The digital signature is cryptographically signed using ECDSA private keys. The process of checking the digital signature of a transaction includes: extracting an encrypted representation of the digital signature; decrypting the representation to obtain a signature hash value; and comparing the signature hash value to a hash value calculated by the verifier node based on the transaction data. In contrast with Bitcoin, transactions are only verified by sufficiently many verifiers to cope with t Byzantine nodes. The consensus protocol runs by n nodes, is resilience optimal in that it tolerates t<n/3 Byzantine nodes, and runs in partially synchronous networks (as described below).

In the described embodiments, the system nodes are computing devices configured to execute a RBBC transaction processing application which enables the node to participate in the blockchain network (as described below). In the described embodiments, the computing devices are server devices and the RBBC transaction processing application is a dedicated software program executing on an operating system of the device. Each node is assigned the role of a proposer and/or a verifier to process a particular group of transactions. The roles of the nodes in the system can be determined dynamically based on the transactions to be processed by the network, or according to a predetermined role assignment scheme.

The nodes located in particular geo-locations can be assigned the role of a proposer in order to improve system performance in geo-distributed environments. For example, blockchain servers are likely to receive different sets of transactions coming from requesters located in different regions. Since the RBBC system combines all the sets of transactions proposed by distinct servers into a unique block, proposer node roles can be allocated to minimise latency in communications between regions.

The described embodiments of the RBBC system and process, include an improved consensus protocol which allows for the deciding of multiple proposed sets of transactions. The RBBC system performs consensus based on a Democratic BFT (DBFT) protocol that extends a Byzantine algorithm to allow creation of the decided block from multiple proposed sets of transactions. Specifically, the RBBC incorporates a new Byzantine consensus protocol that improves upon existing weak coordinator based consensus protocols (referred to as weak coordinator DBFT or "WC-DBFT" consensus). In conventional BFT protocols, messages are delivered in an asynchronous round via the use of a unique coordinator process (referred to as a "leader") that broadcasts a decided proposal after a constant number of message delays. By contrast, in WC-DBFT protocols a weak coordinator is used which does not impose its proposed value as the decided value.

The use of the improved WC-DBFT protocol allows processes of the system to complete asynchronous rounds as soon as they receive a threshold of messages, instead of having to wait for a message from a coordinator that may be slow. Non-faulty nodes of the system can therefore decide a value quickly without the help of the coordinator. Furthermore, having a weak coordinator allows rounds to be executed optimistically without waiting for a specific message. Although not described herein, RBBC could potentially benefit from the implementation of other BFT consensus optimizations in conjunction with the described improved WC-DBFT technique (such as, for example, to allow temporary inconsistencies and transaction rollback).

A reconciliation process is performed following consensus to ensure that the details of each transaction are valid. For example, in the case of an implementation for financial transactions, reconciliation involves checking whether the transaction is executable, irrespective of whether the transaction is correctly specified (as determined during verification).

RBBC System

FIG. 1 illustrates an embodiment of the RBBC system 100 in the form of a distributed network, including: a client 102; and a set of computing nodes, including a plurality of n proposer nodes ($p_1$-$p_n$), and a plurality of m verifier nodes each of which is associated with at least one corresponding proposer node $p_1$-$p_n$ as organised in respective verifier node groups $g_1$-$g_n$. In FIG. 1, each verifier node is shown as associated with a single proposer node $p_i$, such that the verifier node groups $g_i$ and $g_j$ are disjoint. However, in other system configurations the verifier node groups may not be disjoint such that overlap occurs between the verifier nodes of one or more verifier groups (e.g. where one or more verifier nodes are each associated with a plurality of proposer nodes).

In some embodiments, the system 100 also includes a Blockchain server (BC Server) 103 configured as a server computing device in communication with the one or more nodes. The BC server 103 can be configured to route transactions submitted by the client 102 to one or more of the other nodes, and to host application software (such as a RBBC application) that enables a computing device to act as a node within the system 100.

Client node 102, BC server 103, and proposer nodes $p_1$-$p_n$ communicate via the exchange of data over at least one communications network 150, which is a local area network (LAN) or wide area network (WAN). In other embodiments, the nodes may exchange data via a direct connection. Verifier nodes are configured to communicate with their associated proposer node, and with each other node within the same verifier group (as shown in FIG. 1 for proposer node $p_1$ and verifier nodes $v_1$-$v_4$ of group $g_1$).

System 100 operates as a blockchain network to process a group of transactions by including one or more of the transactions in a blockchain data structure. The blockchain structure provides a permanent, immutable and distributed record of the transactions performed by the client 102. Each node is configured to execute the RBBC application 300 which enables the node to perform operations including storing and maintaining a copy of the blockchain structure, communicating with other nodes to receive updated blockchain data, and generating block data representing the inclusion of one or more transactions of the group in the blockchain data structure and verifying the correctness of one or more transactions.

In the described embodiments, each node is permissionless, and is capable of and receiving blocks from other nodes and of maintaining a replica of the current state of the blockchain. Transactions are generated by the client node 102 (referred to as a "requester") when a particular application level operation is performed (e.g. request the balance of an account or sending funds to a party).

The RBBC application 300 coordinates the structure of the network and the operations that are to be performed by each node by assigning roles to respective nodes. Roles defined in the described embodiments include: proposers, verifiers, deciders and storers. The proposers accumulate transactions for the requesters, and periodically submit batches of transactions as proposals to be included in the next block of the blockchain structure. The verifiers check the transaction signatures. The deciders run one consensus instance at a time and decide a unique block of verified transactions at a given index of the chain. The storers append the verified block to the blockchain that they maintain locally. The replicas receive blocks from the deciders, hence keeping track of the blockchain state.

In the described implementation, each node acts as both a replica and storer. The set of deciders for transactions proposed by a proposer node includes each of the verifier nodes within the corresponding verifier group. The designation of the node as a proposer or a verifier by the RBBC application 300 determines the functionality of the node in relation to the proposal of transactions for potential inclusion in the chain and the verification of these transactions. In some embodiments, the configuration of each node is determined dynamically by the corresponding RBBC application instance 300. In this case, the node is assigned a role specifically for the processing of a particular group of transactions.

In other embodiments, the role of a node as a proposer and/or a verifier is predetermined according to some other criteria. The assignment of roles, and the configuration of the network structure, is determined by the RBBC application instances 300. The RBBC application instances 300 perform ad-hoc communication with one another at predetermined intervals to ensure that a suitable network structure is maintained, or to otherwise adjust the proposer and verifier role assignments (e.g. in the case of a failure of part of the network).

RBBC Implementation Assumptions

The RBBC system 100 operates subject to several assumptions which are described below. The failure model is Byzantine such that $t<n/3$ nodes can fail arbitrarily among n that are verifiers. A node is faulty if it is Byzantine, otherwise it is correct. Any number of requesters can be faulty. Among the n nodes, $t+1$ or more play the role of proposers, as enforced by the RBBC application instances 300. A transaction is "committed" when it is included in a decided block that is subsequently incorporated into the blockchain data structure. To ensure termination communication between nodes is partially synchronous in that there exists a global stabilization time after which all messages sent are delivered in less than a fixed but unknown amount of time. This assumption is more realistic than synchrony, as disasters sometimes affect communication delays but the Internet does not remain disconnected.

The system 100 and processes described herein are directed to the processing of transactions related to a cryptocurrency. The blockchain data structure is a sequence of blocks, each containing (i.e. storing) the history of transactions for the cryptocurrency. Client node 102 performs operations resulting in the issuing of transactions, each of which transfers an amount from some account(s) to other account(s). The system is pseudonymous in that there is no clear mapping between accounts and nodes owning them, but each account is protected by a pair of public and private keys, that cannot be stolen or forged.

In contrast with some existing cryptocurrencies, blocks are totally ordered and the blockchain data structure (referred to herein as the "blockchain") never forks (i.e. the existence of multiple blocks at the same height of the blockchain is avoided). Initially, all nodes have a copy of the genesis block of the blockchain that indicates the initial balance of some addresses (i.e. accounts) and the identities of the client as identified by their public keys. Verification of the transaction to confirm or dispute its correctness (i.e. via a transaction signature check, as described below) is distinguished from a reconciliation process that ensures the account balances are non-negative (and therefore that the transaction is valid).

Node and Application Components

Figure 2:
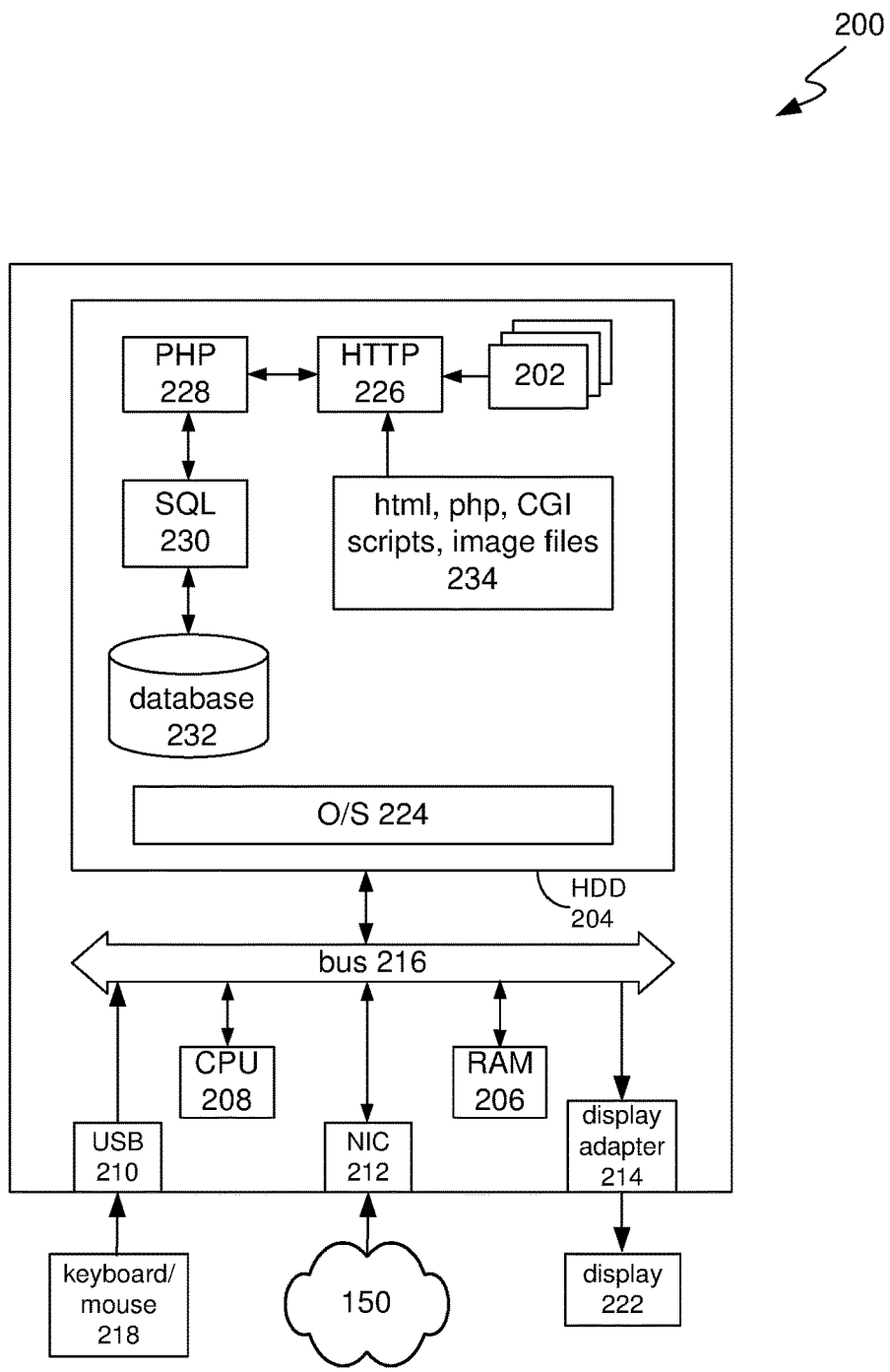
FIG. 2 is a block diagram of a computing device within the blockchain system.

In the described embodiments of the RBBC system 100, each proposer node 110-11$n$ and verifier node 120-12$m$ is implemented as one or more standard computer systems 200, such as, for example, an Intel Architecture computer systems, as shown in FIG. 2, and the processes executed by the system 200 are implemented as programming instructions of one or more software modules 202 stored on non-volatile (e.g. hard disk or solid-state drive) storage 204 associated with the computer system. However, it will be apparent that at least parts of these processes could alternatively be implemented as configuration data of field programmable gate arrays (FPGAs), and/or as one or more dedicated hardware components, such as application-specific integrated circuits (ASICs), for example.

The client node 102 is implemented as a standard computing device (as described above), or as a mobile computing device, such as, for example, a computer system having a 32- or 64-bit Advanced RISC Machine (ARM) architecture (e.g. ARMvx), which operate analogously to the standard computing system 200 depicted in FIG. 2. The client node 102 is configured to execute an application level program that causes transactions to be generated for processing by the RBBC system 100 (e.g. where a user operates a browser application to transfer funds in the form of cryptocurrency to a party).

The system 200 includes random access memory (RAM) 206, at least one processor 208, and external interfaces 210, 212, 214, all interconnected by a bus 216. The external interfaces include universal serial bus (USB) interfaces 210, at least one of which is connected to a keyboard 218 and a pointing device such as a mouse 219, a network interface connector (NIC) 212 which connects the system 200 to a communications network, such as the Internet, and a display adapter 214, which is connected to a display device such as an LCD or LED panel display 222.

The system 200 also includes a number of standard software modules 226 to 230, including an operating system 224 such as Linux or Microsoft Windows, web server software 226 such as Apache, available at http://www.apache.org, scripting language support 228 such as PHP, available at http://www.php.net, or Microsoft ASP, and structured query language (SQL) support 230 such as MySQL, available from http://www.mysql.com, which allows data to be stored in and retrieved from an SQL database 125.

In the described embodiments, each node 110-11n, 120-12m operates as a standalone server computing device which stores a copy of the blockchain within database 232. The database 232 is implemented using SQL and is accessed by a database management system (DBMS) of the node. In other embodiments, the database 232 may be implemented on a separate computing device, or across multiple computing devices according to one or more techniques for the distributed processing and storage of data. However, in such embodiments the blockchain remains sufficiently replicated to provide reliability and security of the transaction data stored within.

Figure 3:
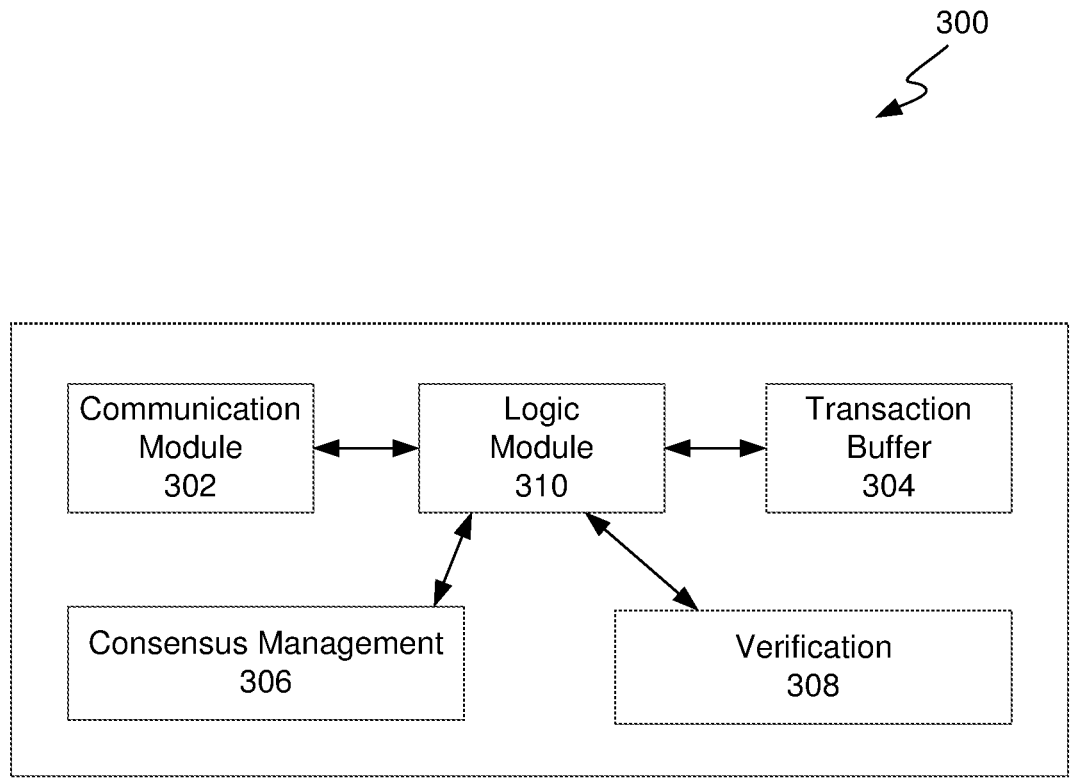
FIG. 3 is a block diagram the components of blockchain software application in accordance with some embodiments of the present invention.

FIG. 3 illustrates the components of the RBBC application 300, which include: a communication module 302 for the exchange of data between a corresponding application instance (i.e. as executing on another node); a transaction buffer 304 for storing transactions to be processed by the system 100; a consensus management module 306 for implementing a consensus protocol for the RBBC processing processes described herein; a verification module 308 for verifying individual transactions; and a logic module 310 configured to control the operation of the RBBC application 300.

Communications module 302 enables the exchange of data between nodes of the system 100 for the purpose of processing transactions. Nodes exchange data via messages of a predetermined form, where the messages are transmitted according to a communications protocol that is specific to the network architecture (e.g. an IP protocol may be used in the case where communications network 150 is an Internet-based WAN). The transaction buffer 304 is implemented as module which manages a dedicated memory space allocated within a storage component (such as HDD 204) of the computing device (also referred to as the "mempool" of the node). The transaction buffer 304 stores, in the mempool, transaction data for transactions that are to be processed by the application 300. The mempool is accessed via an internal data structure (such as a list, array or table) which can be indexed to retrieve specific transaction values. In the described embodiments, the data stored for each transaction includes: an identifier value uniquely identifying the transaction; a public key value of the sender; an amount or value of the transaction; a public key value of the receiver; and a digital signature value allowing verification of the transaction.

The consensus management module 306 implements a consensus protocol which controls the selection of transactions for proposal, and the decision of blocks to add to the blockchain. Consensus is performed according to a WC-DBFT protocol in the described embodiments. However, in some embodiments the consensus management module 306 is configurable to implement one or more other consensus algorithms. This allows the consensus operation performed by the system 100 to be adapted dynamically.

The verification module 308 is configured to process transaction data of individual transactions to determine whether the transaction is correct (as described below). A correct transaction is one in which the digital signature confirms that the specified amount is to be sent to the receiver, and that the transaction truly originated from the sender. The verification module 308 includes hashing and encryption functions used to decrypt the digital signature value of the transaction data, and to generate a hash value from the transaction fields for comparison with a corresponding hash value contained in the digital signature (as described below).

Logic module 310 controls the transaction processing operations performed by application 300. In the described embodiments, the logic module 310 stores state data specifying, for the node on which the application 300 executes (the "reference node"), at least: an identifier of the node (e.g. a node ID); role data indicating the current role(s) of the node; a local copy of the blockchain; and related node data specifying other nodes with which the reference node communicates with to perform transaction processing (e.g. the verifier nodes in the verifier group associated with the reference node, when the reference node has a proposer role). The logic module 310 processes data received from other nodes, via the communication module 302, to update the state data and/or to invoke one or more of the other modules 302-308. For example, the logic module 310 may process received network configuration data to update the role of the node, and may generate block data to update the blockchain in response to received consensus data (as described below).

RBBC Process

Figure 4:
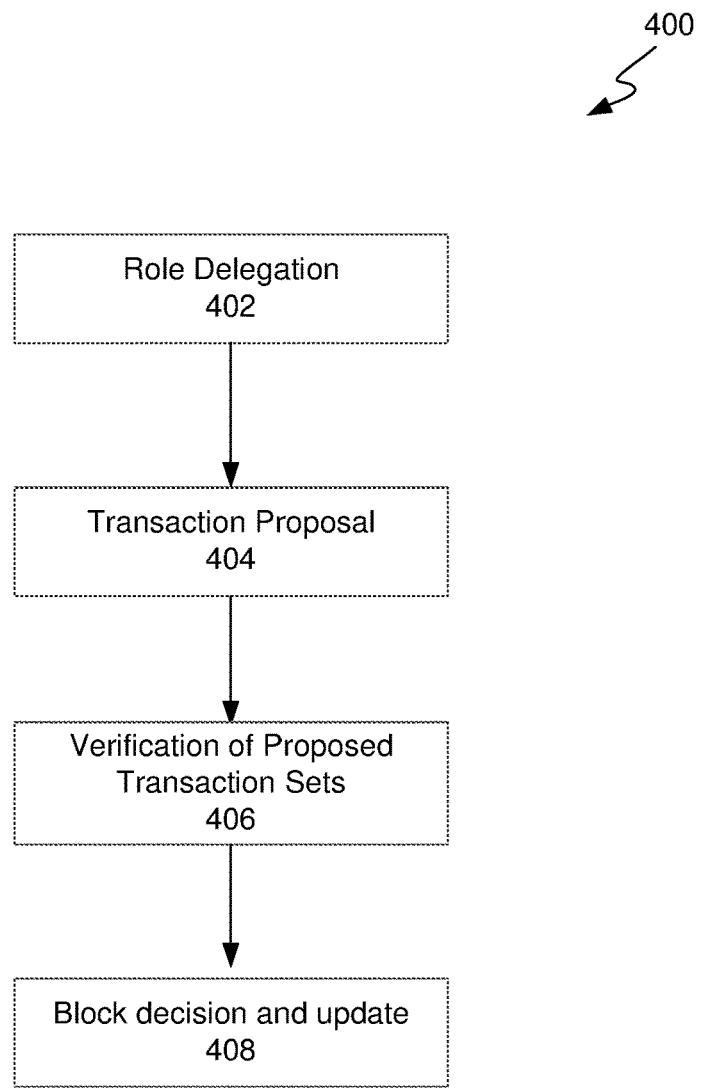
FIG. 4 is a flow diagram of a blockchaining process in accordance with some embodiments of the present invention.

FIG. 4 illustrates the RBBC process 400 used by the system 100 for the processing of transactions. At step 402, the system is configured according to a role delegation process which assigns a role to each node. The number of proposers n is greater t+1 to guarantee that every transaction will be proposed but can be as large as N, the total number of nodes in the system. Fewer proposers results in lower latency, whereas more proposers increase throughput. Each proposer $p_i$ is mapped to a set of t secondary proposers in case $p_i$ is faulty. As each proposal (i.e. set of proposed transactions) must be verified between t+1 and 2t+1 times, each proposer $p_i$ is also mapped to a set of t+1 primary verifiers and a set of t additional secondary verifiers. The secondary proposer roles are spread over the proposers and the verifiers are spread over all the nodes to balance the load. To minimize inter-node communication, the intersection between the secondary proposers and primary verifiers is maximised. In the case of $|\rho|=n$, the set of secondary proposers is equal to the set of primary verifiers, as all n nodes play both of the proposer and verifier roles.

In the described embodiments, a deterministic and greedy strategy is used to assign roles to nodes. Prior to delegation, initialisation data specifies a list of initial proposer and verifier nodes, each with a counter of the times the node has been assigned the role of secondary proposer, or primary or secondary verifier. A looping process is performed to iterate through the list of primary proposers, as ordered by their node id, and assign each a secondary proposer or verifier by choosing the node that has the lowest count for that role until all roles are filled (ties are broken by node id). Therefore, it is possible that a single node can be assigned the role of both a verifier and a proposer, and in this case the node performs the functions associated with each role independently during corresponding processing stages.

Following role delegation, the transactions of a client 102 are proposed in batch, are verified, and the blockchain is updated to include the verified transactions. At step 404, each proposer node (i.e. any node that is assigned the role of primary proposer) proposes a transaction set to their verifiers for verification. In a configuration with n proposers $p_1$-$p_n$, the proposal step 404 therefore involves the generation of n sets of transactions that are disjoint (i.e. the proposed set of each proposer node contains different transactions). Proposal is achieved by a transaction broadcast message transmitted from the proposer node to the set of verifiers.

At step 406, the corresponding verifier group $v_i$ of each proposer node $p_i$ performs verification of the transactions in the proposed set. Verification is needed to guarantee that the UTXO transactions are correctly signed. As verifications are CPU-intensive and notably affect the performance of conventional blockchain processing. In the RBBC process, the verification is sharded since different verifier nodes verify distinct transactions. The expected result is twofold. First, it improves performance as it reduces the computational load of each verifier (as shown by experimental analysis herein below). Second, it helps scaling by further reducing the per-verifier computational load as the number of verifier increases.

Figure 5A:
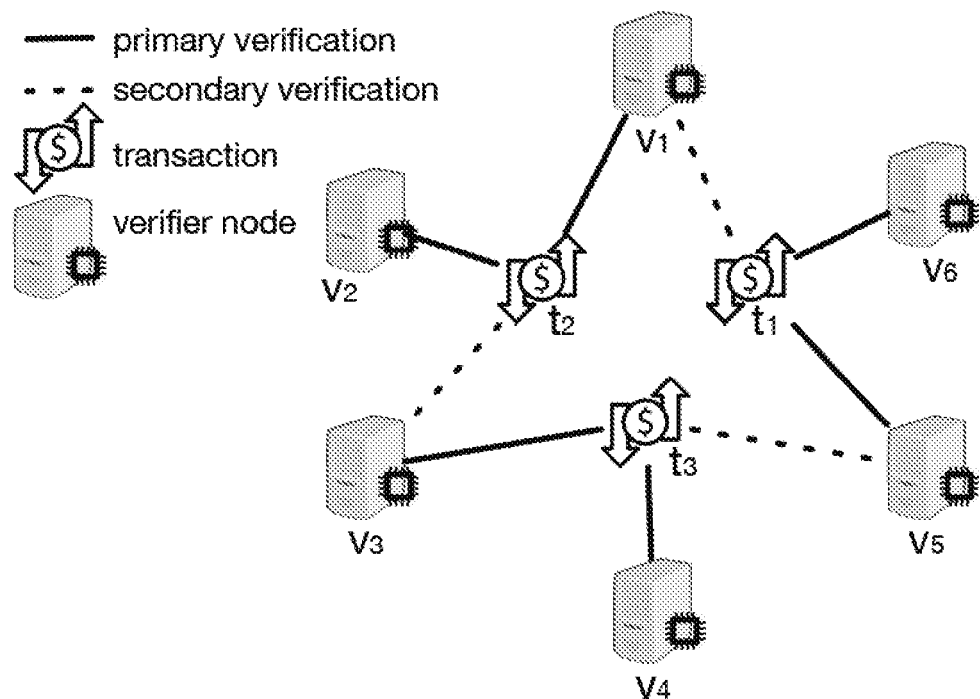
FIG. 5a is a schematic diagram illustrating the verification of transactions by the blockchain system.

As t verifier nodes can be Byzantine, each transaction signature has to be checked by at least t+1 verifier nodes. If all the t+1 verifier nodes are unanimous in that the signature check passes, then at least one correct node checked the signature successfully and it follows that the transaction is guaranteed to be verified. Given that t nodes may be Byzantine, a transaction may need to be verified up to 2t+1 times before t+1 equal responses are computed. The sharded verification process 406 consists of assigning transactions to two groups of nodes: the t+1 primary verifiers and t secondary verifiers. FIG. 5a depicts an example of the sharded verification process with n=6 and t=1, where each transaction is verified by t+1 (i.e. 2 in this example) primary verifier nodes (linked to the transaction with a solid line), before being verified only if necessary by t (i.e. 1 in this example) secondary verifier nodes (linked to the transaction with a dashed line).

Once a node receives one of the transactions for which it is a primary verifier, it immediately verifies the corresponding transaction and broadcasts the outcome of the verification to all associated nodes (i.e. the corresponding proposer node $p_i$ and other verifier nodes in the group $v_i$). Once done with primary verifications, if a node did not receive t+1 equal responses regarding the validity of a transaction for which it is a secondary verifier, verification is performed by the node and the outcome is broadcast.

At step 408, consensus results in the decision of a block, and a corresponding update to the blockchain in respect of the verified transactions of each proposed set. RBBC extends an existing leader based Byzantine consensus algorithm to decide multiple proposed sets of transactions. To illustrate why this is key for scalability, consider that each of the n proposers propose O(1) transactions. As opposed to blockchains based on traditional Byzantine consensus that will decide O(1) transactions, RBBC can decide $\Omega(n)$ transactions. As the typical communication complexity of Byzantine consensus is $O(n^4)$ bits, $O(n^3)$ bits are needed per committed transaction in RBBC, instead of $O(n^4)$.

Figure 5B:
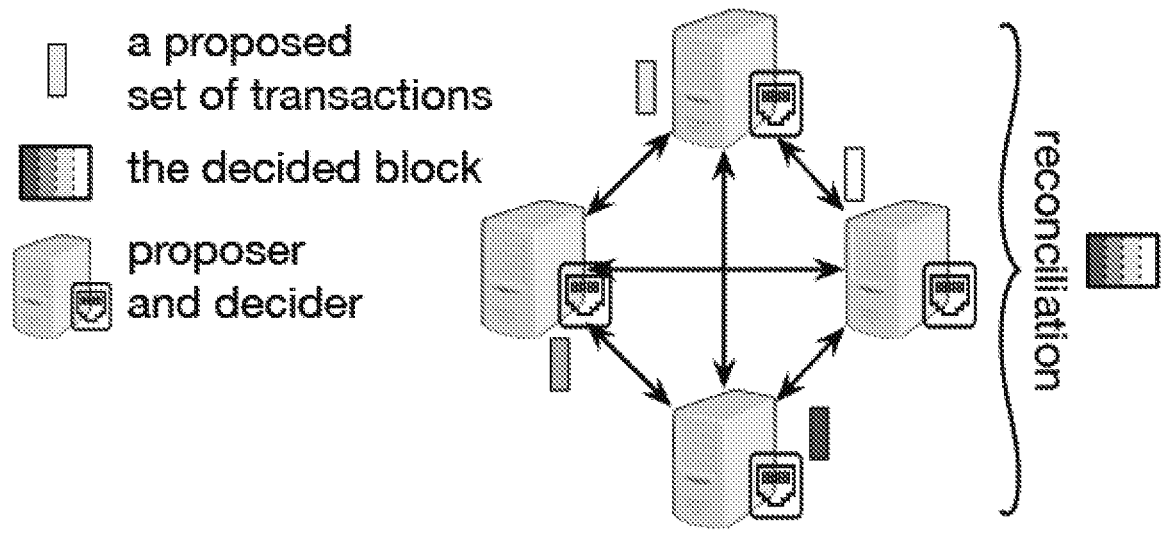
FIG. 5b is a schematic diagram illustrating the deciding of a block of verified transactions by the blockchain system.

FIG. 5b illustrates the RBBC optimized decision process for n=4 proposer nodes. Consensus is executed by n=4 nodes among which t=1 is Byzantine, such that they propose sets of transactions (depicted with gray rectangles), and where the decided value (on the right-hand side) is a block containing the union of all verified transactions from the sets that were proposed (even the set proposed by the Byzantine node). In this implementation, the number of transactions decided grows linearly in n as long as each proposer node proposes disjoint sets of transactions.

In the described embodiments, the consensus process results in a determination of the sets of transactions to be decided. However, some of these transactions may not be executable (i.e. valid). For example, if a transaction specifies the withdrawal of a total amount from an address that exceeds its remaining balance, then the transaction is invalid. Thus before committing the transactions, a deterministic reconciliation is performed at every node in lexicographical order of the transactions in the decided sets. Note that the computation needed for reconciliation is negligible compared to the signature verification.

Weak Coordinator Efficient Byzantine Consensus

The RBBC system implements an efficient democratic Byzantine fault tolerant (DBFT) consensus protocol which solves the consensus problem of asynchronous message-passing by using an improved version of weak coordinator BFT consensus (referred to as "WC-DBFT"). The improved WC-DBFT protocol presented herein is a reduction from the binary Byzantine consensus to the multivalue consensus and is also time optimal, resilience optimal and does not use a classic (strong) coordinator, which means that it does not wait for a particular message. In addition, it finishes in only 4 messages delays in the good case, when all non-faulty processes (i.e. nodes, in the context of a blockchain system) propose the same value.

Consider a variant of the classical Byzantine consensus problem, called the Validity Predicate-based Byzantine Consensus (denoted VPBC). Its validity requirement relies on an application-specific valid( ) predicate that is used by blockchains to indicate whether a value is valid. Assuming that each non-faulty process proposes a valid value, each of them has to decide on a value in such a way that the following properties are satisfied: VPBC-Termination, where every non-faulty process eventually decides on a value; ii) VPBC-Agreement, where no two non-faulty processes decide on different values; iii) VPBC-Validity, where a decided value is valid, (i.e. it satisfies the predefined predicate denoted valid( )), and if all non-faulty processes propose the same value v then they decide v.

The above definition generalizes the classical definition of Byzantine consensus, which does not include the predicate valid( ). This predicate is introduced to take into account the distinctive characteristics of consortium blockchains, and possibly other specific Byzantine consensus problems. In the context of consortium blockchains, a proposal is not valid if it does not contain an appropriate hash of the last block added to the Blockchain or contains invalid transactions.

In the implementation of WC-DBFT described herein, the processes cooperate with an array of binary Byzantine consensus objects denoted BIN_CONS[1 . . . n]. The instance BIN_CONS[k] allows the non-faulty processes to find an agreement on the value proposed by $p_k$. To simplify the presentation, consider that a process $p_i$ launches its participation in BIN_CONS[k] by invoking BIN_CONS[k].bin_propose(v), where v∈{0, 1}. Then, it executes the corresponding code in a specific thread, which eventually returns the value decided by BIN_CONS[k].

Each process $p_i$ manages the following local variables (where ⊥ denotes a default value that cannot be proposed by a process):

An array proposals$_i$[1 . . . n] initialized to [⊥, . . . , ⊥]. The aim of proposals$_i$[j] is to contain the value proposed by $p_j$; and An array bin_decisions$_i$[1 . . . n] initialized to [⊥, . . . , ⊥]. The aim of bin_decisions$_i$[k] is to contain the value (0 or 1) decided by the binary consensus object BIN_CONS[k].

The WC-DBFT consensus protocol is a reduction from the binary Byzantine consensus method to a multivalue Byzantine consensus method. The protocol differs from existing reductions in that it that it combines the reliable broadcast with binary consensus messages to finish in 4 message delays in the good case. An implementation of the WC-DBFT protocol is shown in FIG. 5c as an algorithm invoked by the mv_propose(v) function. A process (i.e. a node of the RBBC system) commences consensus by invoking mv_propose(v), where v is the value it proposes to the multivalued consensus. Execution of the consensus algorithm then involves four phases:

Phase 1: $p_i$ disseminates its value (lines 01 and 11 by first sending its value to all the processes via the RB-broadcast operation (line 01). If a process RB-delivers a valid value v RB-broadcast by a process $p_j$, then the process stores it in proposals$_i$[j] and BV-delivers 1 directly to round one of instance BIN_CONS[j] (line 11), placing 1 in its bin_values, for that instance.

Phase 2: Process $p_i$ starts participating in a first set of binary consensus instances (lines 02-04). It enters a loop in which it starts participating in the binary consensus instances. Process $p_i$ invokes a binary consensus instance k with value −1 for each value RB-broadcast by process $p_k$ that $p_i$ RB-delivered. −1 is a special value that allows the binary consensus to skip the BV_broadcast step (line (Opt1)) and immediately send an aux message with value 1, allowing the binary consensus to terminate with value 1 in a single message delay. (Note that the timeout of the first round is set to 0 so the binary consensus proceeds as fast as possible.)

The direct delivery of 1 into bin_values is possible due to an overlap in the properties of BV_broadcast and RB-broadcast, allowing us to skip a message step of our binary consensus algorithm. In other words, all non-faulty processes will RB-deliver the proposed value, and as a result will also BV-deliver 1. This loop stops as soon as pi discovers a binary consensus instance BIN_CONS[I] in which 1 was decided (line 04) (as all non-faulty processes will only have 1 in their bin_values until an instance terminates, the first instance to decide 1 will terminate in one message delay following the RB-delivery).

Phase 3: $p_i$ starts participating in all other binary consensus instances (lines 05-06). After it knows a binary consensus instance decided 1, $p_i$ invokes with bin_propose(0) all the binary consensus instances BIN_CONS[k] in which it has not yet participated. For some of these instances BIN_CONS[k], it is possible that no process has RB-delivered a value from the associated process $p_k$. This consensus participation technique aims to ensure that all binary consensus instances eventually terminate.

Phase 4: $p_i$ decides a value (lines 07-10 and 12). Process $p_i$ considers the first (according to the process index order) among the successful binary consensus objects, i.e. the ones that returned 1 (line 08). Let BIN_CONS[j] be this binary consensus object. As the associated decided value is 1, at least one non-faulty process proposed 1, which means that it RBdelivered a value from the process $p_j$ (lines 02-03). Observe that this value is eventually RB-delivered by every non-faulty process. Consequently, $p_i$ decides it (lines 09-10). As soon as the binary consensus instance with the smallest process index terminates with 1, the reduction can return as soon as the associated value is RB-delivered. This is due to the observation that the values associated with the larger indices will not be used.

The above described steps allow the WC-DBFT consensus algorithm to terminate in 4 message delays in the good scenario, (i.e. 3 message delays to execute the reliable broadcast and 1 to complete the binary consensus by skipping the BV_broadcast step).

RBBC—Proposer Process

Figure 6:
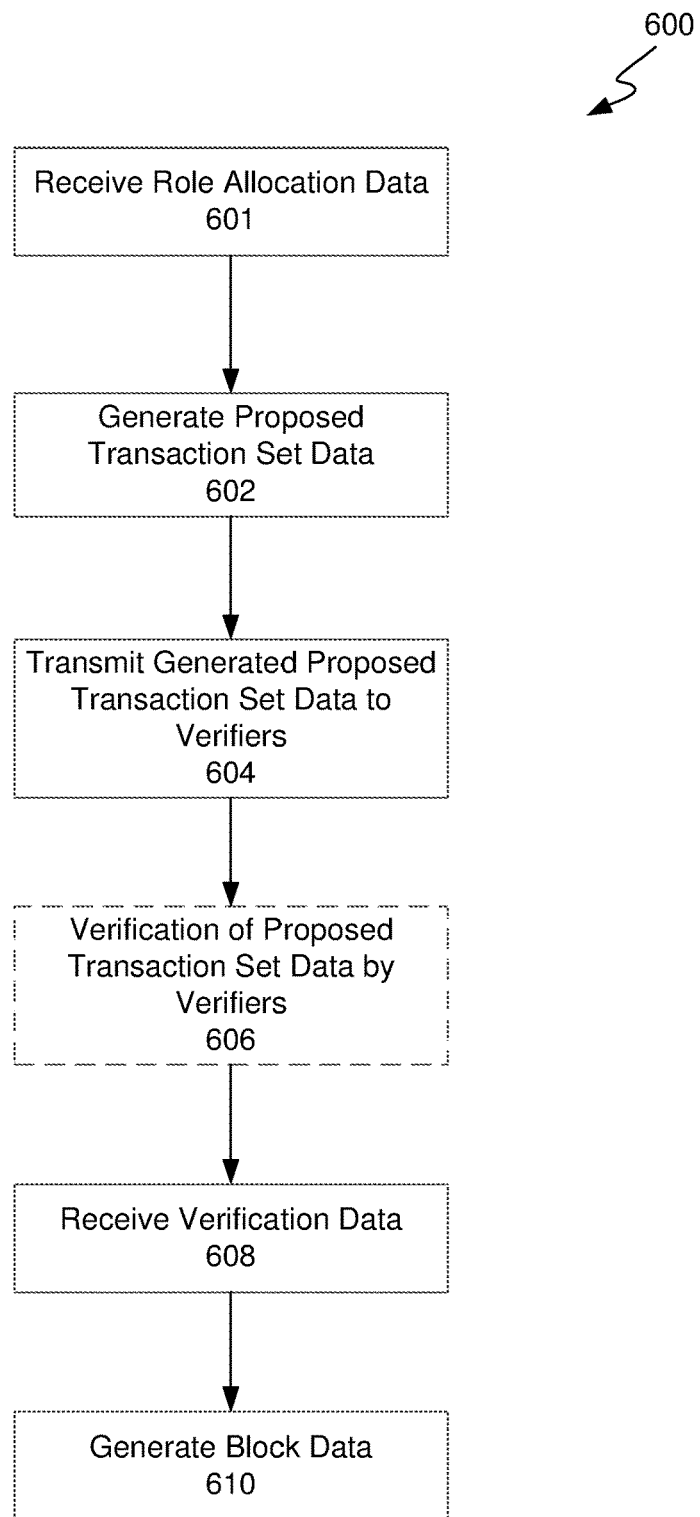
FIG. 6 is a flow diagram of a blockchaining process performed by a proposer node in accordance with some embodiments of the present invention.

FIG. 6 illustrates a blockchaining process 600 executed by a proposer node $p_i$ of the RBBC system 100. At step 601, the proposer node receives configuration data indicating a role allocation of the system nodes to be used for the processing of the transactions. The configuration data specifies the n proposer nodes ($p_1$-$p_n$), and the corresponding verifier node groups $g_1$-$g_n$. In the described embodiments, a particular proposer node $p_i$ can be a verifier node of its own group $g_i$, or of any other group $g_j$.

At step 602, the proposer node $p_i$ generates proposed transaction data representing a set of proposed transactions T($p_i$) from a group of transactions T that are to be processed by the system 100. The proposed transactions T($p_i$) are distinct from the proposed transactions T($p_j$) of one or more other proposer nodes $p_j$.

Figure 7:
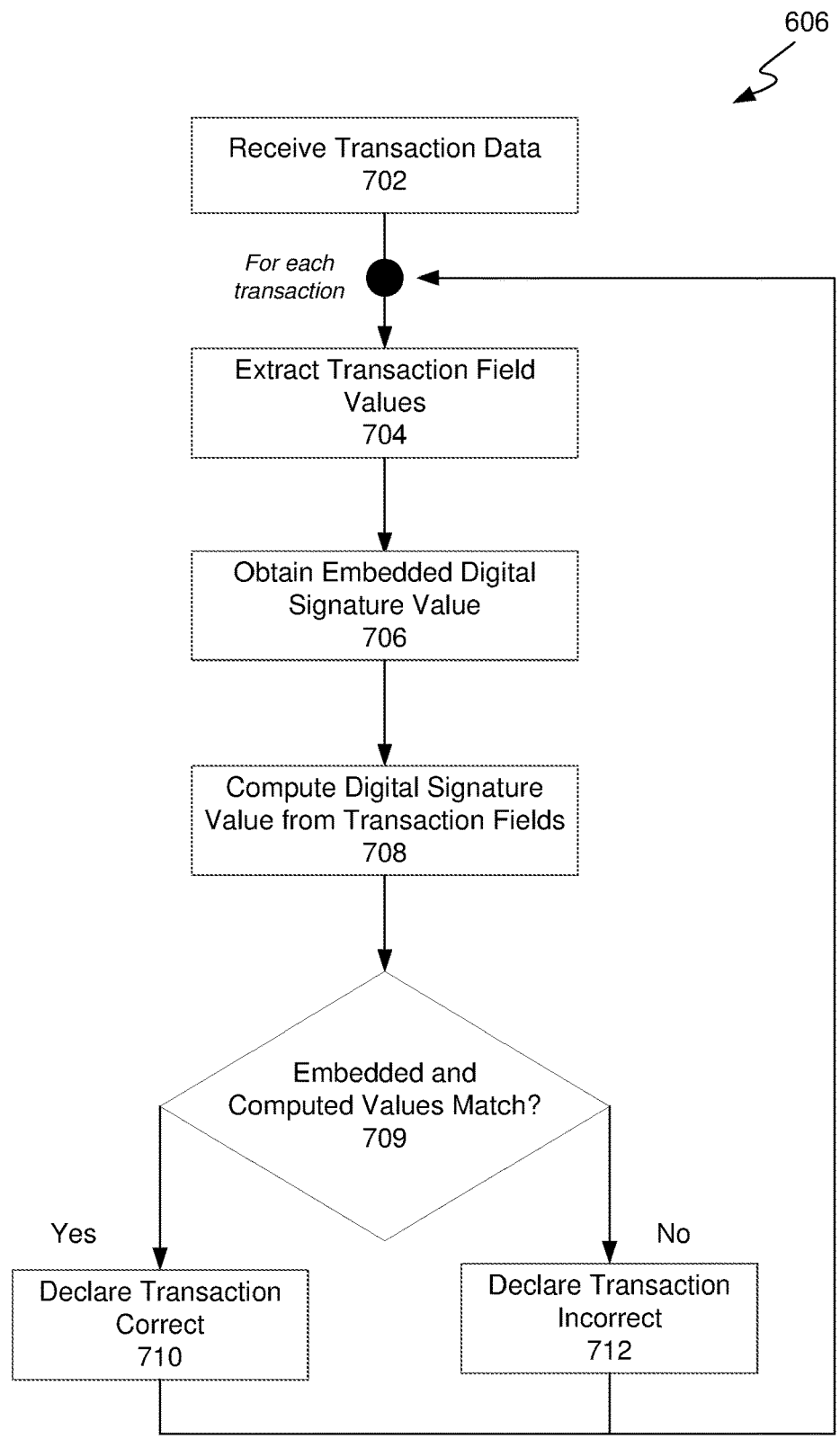
FIG. 7 is a flow diagram of a transaction verification step of the blockchaining process as performed by a verifier node.

At step 604, data representing the proposed transactions T($p_i$) is transmitted to a predetermined number of associated verifier computing nodes for verification of each proposed transaction. This is achieved by the proposer node $p_i$ broadcasting the proposed transaction data to each verifier node in the associated group $g_i$. The verifier nodes in group $g_i$ perform verification of each transaction T($p_i$) at step 606. FIG. 7 illustrates the transaction verification process performed by a verifier node. When the verifier node is not the proposer node $p_i$, the verifier node receives proposed transaction data via a broadcast message from the associated proposer node (i.e. at step 702). Each transaction of the proposed transaction set is subject to verification operations performed by the verification module 308 of the verifier node.

At step 704, the verification module 308 extracts values for the transaction fields including: the transaction identifier; the public key of the sender; the amount or value of the transaction; the public key of the receiver; and the encrypted digital signature representation. At step 706, a decryption operation is applied, using the sender's known public key, to the digital signature representation to obtain the digital signature hash value. In the described embodiments, RSA encryption with a key length of 256 bits is used, and hashes are produced via application of the SHA algorithm.

At step 708, the verification module 308 computes a hash value of the received transaction data values. The aforementioned values are concatenated in a predetermined arrangement which is the same arrangement used by the client 102 to produce the hash value included in the digital signature (i.e. prior to encryption). At step 709, the verification module 709 compares the computed hash value to the value embedded in the digital signature (as extracted in step 706). If the has values match, then at step 710 the transaction is declared as correct indicating that it truly originated from the sender (i.e. the client 102). Otherwise, at step 712, the transaction is declared as incorrect.

Verification data representing the result of the verification process of step 606 is broadcast from each verifier node in group $g_i$ to the proposer node $p_i$, and to one or more of the other verifier nodes in the group $g_i$. At step 608, the proposer node $p_i$ receives the verification data and records the corresponding verification result for each transaction of the proposed set. Following verification of all transactions T($p_i$), the proposer node $p_i$ generates block data to include one or more transactions in the blockchain (i.e. at step 610). The included transactions are the verified ones of: transactions T($p_i$) (i.e. the proposed transaction set of the proposer $p_i$); and transactions T($p_j$), j=1 . . . n, j≠i (i.e. the respective proposed transaction sets of the other proposer nodes). The logic module 310 of the RBBC application 300 processes the generated block data to append the decided block to the existing chain structure thereby updating the local copy of the blockchain within the state data of proposer pi.

In the described embodiments, generation of the block data occurs as a result of the block being decided and reconciled in respect of the verified transactions. Specifically, the proposer node pi generates block data based on block decision and reconciliation data received from decider nodes in the corresponding verifier group $g_i$. The block decision process is performed by the DBFT consensus protocol which combines the sets of transactions proposed by distinct proposer nodes into a unique block. Reconciliation is performed to remove transactions which are invalid from the decided block.

Exemplary Implementation of the RBBC System

Described herein below is an exemplary implementation of the RBBC system 100 according to some embodiments. In this implementation, requesters, such as client 102, can request the balance of an account or send a transaction to some proposers. From time to time the p proposers extract some transactions from their mempool that they propose to the consensus. The number of proposer nodes in the set p is n (i.e. $|p|=n$). The consensus protocol triggers a first $|p|$ verified reliable broadcast instances, and then $|p|$ instances of the existing binary Byzantine consensus. The consensus is set to terminate after 4 message delays in the good case and its correctness derives from the proof of the original consensus algorithm. The verified reliable broadcast instances make sure every correct node populates an array of $|p|$ proposals with only correctly signed transactions.

All binary Byzantine consensus instances output 1 or 0 to populate a bit mask of $|p|-t$ 1 s. The correct nodes apply this bitmask to the array of proposals to obtain $|p|-t$ sets of transactions. The nodes run these transactions against a UTXO table to discard the conflicting or duplicated transactions before combining the rest into a new block that is appended to the blockchain.

Figure 8:
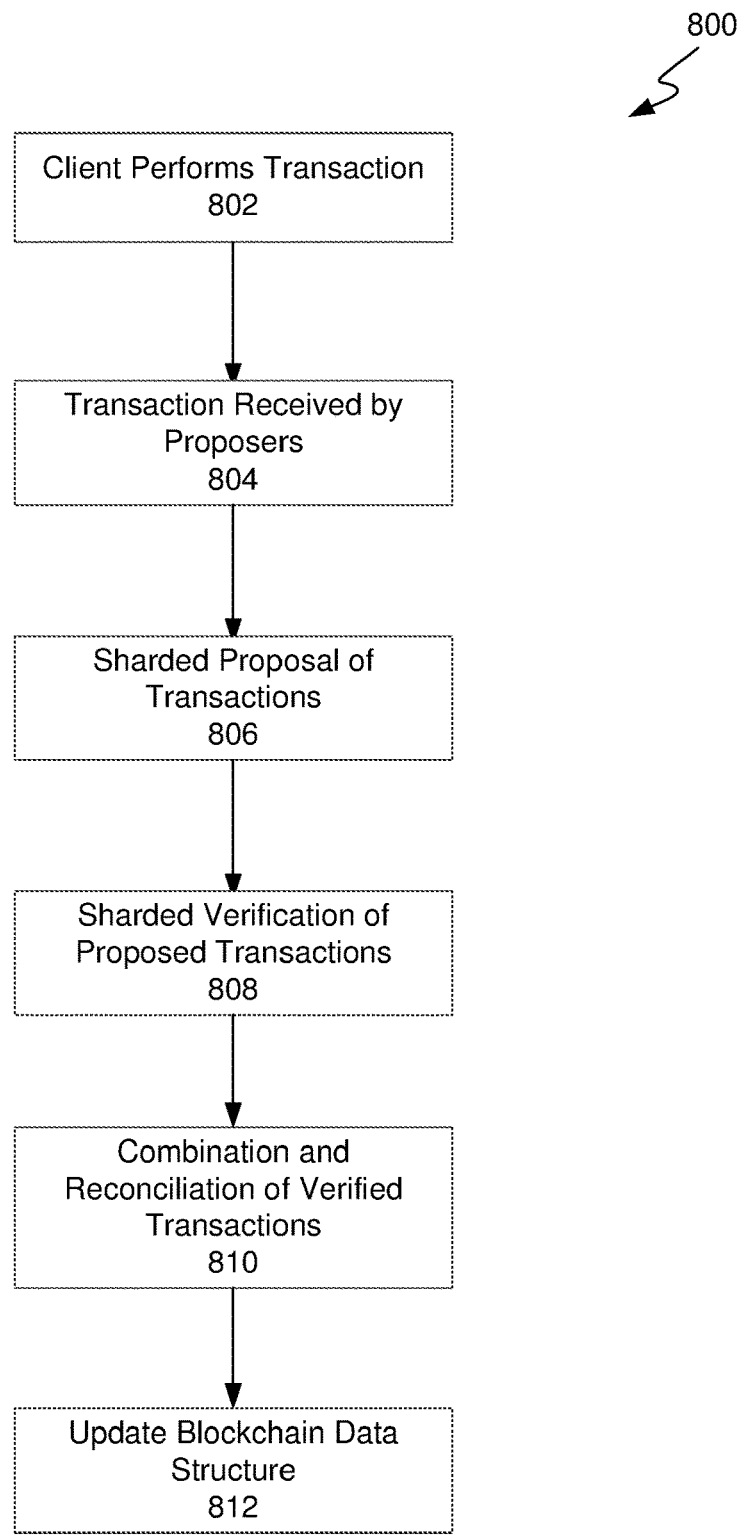
FIG. 8 is a flow diagram of an exemplary blockchaining process performed in accordance with some embodiments of the present invention.

FIG. 8 illustrates a high-level blockchain process 800 executed by the system 100 in accordance with the exemplary implementation. At step 802, the client 102 performs operations resulting in the submission of transactions for processing by the system 100. Transactions can be submitted to particular permissioned nodes via an intermediate server (such as BC server 103), or via the client (i.e. requester) directly through a set of JSON RPCs, including:
 submit_transaction(tx) which runs at proposer nodes taking a transaction tx as input, and is called by the requester at all t+1 of its proposers, such that if the transaction is valid it is placed in the mempool and true is returned; and
 request_utxos(account) which can be run at any node taking an account as input and returning the set of utxos. A requester performs this operation at different deciders until t+1 equal notifications are received.

At step 804, the transactions are received by the proposer nodes. The consensus instance commences with each proposer node selecting a set of transactions to propose (i.e. the proposed transaction set) from their mempool. The proposer nodes accumulate transactions in their mempool until the ongoing consensus instance terminates and the first of the following conditions is met: (i) a predetermined mempool size β is reached; (ii) a time δ elapses since the proposer proposed its last block; and (iii) the proposer receives t+1 proposals from different nodes. This limits the block size and the transaction commit-time, and also makes the proposers reactive.

As a proposal size is predetermined, a proposer node p may have to propose a subset of the mempool transactions. The proposer p selects transactions for proposal based on factors including the transaction age, and the number of blocks appended to the chain since these transactions joined the mempool. In this exemplary implementation, transactions for which p is a primary verifier are firstly selected, and then transactions are selected in decreasing order of their age. Transactions for which p is a secondary proposer and that are younger than a predetermined constant a are not selected, limiting duplicate proposals between primary and secondary proposers.

At step 808, a sharded verification process is performed on the proposed transactions $T(p_i)$ by the verifiers in each group $g_i$ corresponding to $p_i$. A verification step is added to the classic reliable broadcast, which is originally a 3-step one-to-all communication abstraction where any message delivered to a correct node gets eventually delivered to all correct nodes. The reliable broadcast protocol consists of the following steps: i) the broadcasting of an init message containing a proposal; ii) upon reception, the proposal is broadcast by all nodes in an echo message (Note that the init message of the proposer is considered as its echo message); iii) Upon reception of $\lceil(n+t+1)/2\rceil$ equal echo messages, a ready message containing the proposal is broadcast; and iv) Upon reception of 2t+1 equal ready messages, the proposal is delivered. If the node receives t+1 equal ready messages before it has sent a ready message, then it broadcasts that ready message.

In the described processes, the verification step is added before the broadcast of the ready message. Specifically, upon reception of $\lceil(n+t+1)/2\rceil$ equal echo messages at a verifier node, the verification of the proposal starts. Upon completion, a list of integers indicating the indices of invalid transactions in the proposal is appended to the ready message, which is then broadcast. Nodes that are not in the verifier sets will only broadcast a ready message upon the reception of t+1 equal ready messages. Nodes that do not verify the proposal will be aware of the invalid transactions through the list appended to the ready message.

To minimize the number of verifications performed, each verifier node is configured to prioritize the verification of proposals for which it is a primary verifier. Upon reception of t+1 equal ready messages, a node no longer needs to verify the proposal as it was verified by at least one non-faulty node. Thus, depending on proposal size and network performance, a proposal is verified between t+1 and 2t+1 times. Note that a non-faulty verifier never remains idle if it has at least one proposal to verify, even if it has only received proposals for which it is a secondary verifier. This helps to ensure progress in case of faulty proposers.

The aforementioned steps are driven by the WC-DBFT consensus protocol (described above) resulting in sharded transaction proposal and verification. A normal consensus execution is depicted when n=4 and t=1. An instance is run concurrently for each proposer, involving the steps of:
 1. Request. A client computes μ(t) and sends a transaction request tx to the t+1 primary proposers and verifiers. Upon reception, tx is added to the mempool and is verified by the primary verifiers.
 2. Propose. Each proposer selects a set of transactions from its mempool, adds it to its pending table and proposes it to the consensus by sending it in an init message to all other deciders (at step 806).
 3. Echo. Upon reception, deciders broadcast the received proposals in echo messages.
 4. Ready. Upon reception of $\lceil(n+t+1)/2\rceil$ equal echoes, verifiers for these proposals verify them (if not already done in the request step) and send the result in a ready message (at step 808) to all deciders. Upon reception of t+1 equal ready messages, a node broadcasts the ready message if it has not done so already. (Note that this phase can be done in only one message delay).

5. Decide. Upon reception of 2t+1 equal ready messages (at step 808), the deciders input 1 to a binary consensus instance until some binary consensus decides 1. If proposers are non-faulty the binary consensus terminates in a single step.

At step 810, the verified transactions proposed by each proposer are combined to produce a decision block representing the transactions that are to be committed. Reconciliation is performed by the deciders, involving a consideration of each verified proposed transaction in the order of the proposer node ids, and the storing and committing of the transactions that have correct UTXOs. Any pending correctly signed noncommitted transactions from non-decided proposals are put back into the mempool. Clients that have subscribed to the updated accounts, as well as all replicas, are then sent the new list of UTXOs. At step 812, the blockchain is updated locally at each node based on block decision data broadcast by the deciders (as described above).

Waiting for $[(n+t+1)/2]$ equal echo messages has the effect that only a specific proposal can be delivered by reliable broadcast to a verifier group, otherwise no proposal is delivered. If the proposer is non-faulty then all non-faulty nodes will reach this threshold. As verification is deterministic, all non-faulty verifier nodes compute the same list of invalid indices. For at most t faulty nodes, at least t+1 of the 2t+1 verifiers for a proposal are correct, ensuring t+1 equal ready messages, and delivery. Having $|\rho| \geq t+1$ proposers guarantees that at least one proposer is correct and that any requested transaction is eventually delivered. Finally, note that the verified reliable broadcast is not sufficient to reach consensus. As a result, nodes invoke a binary consensus instance for each proposal they delivered. Specifically, nodes input 1 in these binary consensus instances for which corresponding reliable broadcast instances delivered messages. Then following termination of $|\rho|-t$ binary consensus instances the nodes input 0 for the remaining binary consensus instances.

The described implementation of RBBC builds upon the UTXO model from existing cryptocurrencies, where users own one or more accounts, each represented with a public key, a private key, and an associated address (a hash of the public key). Unspent transaction outputs (UTXOs) are unique identifiers indicating a value (in currency) that can be spent (consumed) once. A UTXO table maintains the balance of the accounts. When money is sent in a transaction between users, one or more UTXOs belonging to the sender (the transaction inputs) are consumed and removed from the table, adding one or more UTXOs (the transaction outputs) to the table, e.g. one belonging to the receiver, one belonging to the sender containing any change leftover, and some rewarding the servers. A transaction consists of inputs, outputs, the public key of the sender, the hash of the transaction, and a signature generated by the private key of the sender. A UTXO is approximately 100 bytes, while a small transaction is typically around 360 bytes. When a UTXO is created it is stored in a table that maps the hash of the transaction to its UTXO outputs. The advantage of this model is that transaction verification and commit execute fast on UTXO tables.

In addition to the above described aspects of the exemplary RBBC system 100, several optimisations can be implemented to improve system efficiency and attack resilience. These optimisations relate to: threading; digests; storage and garbage collection mechanisms; establishing secure and reliable channels; and achieving a tolerance to malicious behaviours.

Threading: In the above described implementation, application 300 assigns multiple threads to execute different components of the blockchain process. A primary state-machine thread receives committed and uncommitted blocks from a separate set of consensus threads. Uncommitted blocks are verified and the results are sent back to the consensus threads. Verification is done in parallel by a separate pool of threads. Committed blocks are used to update the state of the UTXO table. Each connected client is served by a separate thread. The request_utxos operation takes a read lock on the UTXO table to not conflict with the updates of the state-machine thread. The submit_transaction operation first checks whether the node is within the transaction's proposer set, then verifies the signature and stores it in the mempool. The mempool runs in its own thread, validating the UTXOs of the proposed transaction and removing any conflicting transactions, then sending blocks of transactions to the consensus threads as proposals. The consensus runs in a separate pool of threads similar to other consensus algorithms (such as BFT-SMaRT).

Digests: To reduce the bandwidth usage of the reliable broadcast, instead of including the full proposal in the echo and ready messages of the reliable broadcast, only the digest of the message is included (i.e. the SHA256 hash in this implementation). This optimization has a potential drawback that in certain cases of Byzantine behavior or poor network performance, a node might only deliver the digest, requiring the node to request the full message from 2t+1 other nodes. The number of nodes receiving the request can be reduced to t+1 by sending the request only to nodes from whom an echo message has been received, one of which must be correct and has received the full message. Delivery then occurs as soon as a message is received that matches the digest.

Storage and garbage collection: To ensure transactions are verified and committed quickly, the UTXO table is stored in memory. As of October 2017 the size of the serialized UTXO set is close to 3 GB. To minimize the size of the UTXO table, transactions should consolidate as many unspent outputs as possible. This decreases the total number of UTXOs for a given user to 1 each time they create a transaction. Each block is stored in an-append only log on disk. Each node keeps a log containing the messages it has broadcast during at least the previous two committed consensus iterations, older messages being garbage collected. Nodes that need to recover messages from older consensus instances simply collect t+1 equal instances of the decided block.

Secure reliable channels: The consensus algorithm relies on secure, reliable channels between the non-faulty nodes participating in the blockchain (note that out of order message delivery is tolerated). To facilitate reliable delivery, each message includes the sending node's current sequence number which is incremented on each broadcast. When a receiving node observes a gap in a sender's sequence number, a negative acknowledgement (NACK) is sent back to the sender requesting the missing messages. Each node is configured to periodically broadcast its latest sequence number.

To avoid message tampering by an unauthorised party, channels are encrypted using TLS. Note that MAC optimizations of classic BFT protocols could be implemented with the described system, however they are less useful over a wide area network as there is typically no access to an IP level broadcast. Furthermore, in the conducted experimentation (discussed below) it was found that TLS had a minor impact on performance when compared to unencrypted channels.

Tolerance to malicious behaviors: To prevent requesters from submitting conflicting transactions to different sets of proposers, p was chosen to take the account as input to compute the set of proposers for the account. The mempool drops transactions with conflicting UTXOs thereby preventing faulty requesters from compromising the correctness of the blockchain.

For example, a requester can avoid sending its transaction to all the primary verifiers, and as a result verification is performed during consensus, instead of beforehand. In addition, proposers can try to send transactions to primary and secondary proposers at specific times so that multiple proposals (i.e. proposed transaction sets) contain the same transaction, creating redundancy which may negatively impact the performance of the system. To deal with this, when proposals with duplicate transactions are detected, the non-faulty secondary proposers can add some randomization to the value a. This reduces the occurrence of duplicate transactions proposed in the same consensus instance.

With a large number of nodes, it can be expected that at least some proposers will be faulty. Previously proposed DBFT consensus algorithms are designed to terminate quickly for correct proposers, but require additional message delays for faulty proposers. This is due to the binary consensus being round based, allowing 1 to be decided in even rounds and 0 to be decided in odd rounds (where the first round is round 0). The additional message delays can be reduced from four to two by flipping the rounds for faulty nodes, so that 0 is decided in even rounds in consensus instances following the first instance where a node behaves maliciously.

Experimental Evaluation

The RBBC system and processes described herein were evaluated in a series of experiments which are detailed below. Evaluation was conducted on up to 1000 server nodes on Amazon EC2 located in up to 14 separate regions. Performance was compared between: (1) the proposed RBBC technique with sharding and DBFT consensus as described above; (2) RBBC where the DBFT consensus was replaced with the Honey Badger BFT protocol (HBBFT)(for which the publicly available cryptographic operations implementation was reused); and (3) RBBC with the DBFT consensus protocol replaced by a classic BFT algorithm CONS1.

Three types of experiments were conducted: (i) with up to 300 deciders all deciding and generating the workload, allowing new proposals to be made as soon as the previous one is committed; (ii) with requesters running on nodes separated from the deciders to measure their impact on performance; and (iii) with up to 1000 nodes all running as replicas, some requesting and some deciding, but all updating their copy of all account balances. Table 1 summarises the parameters used in the experiments.

TABLE 1

Parameters used in the experimental evaluation.

| Notation | Meaning | Value | Motivation |
|---|---|---|---|
| $\mu$ | compute primary proposer | $0 \leq id < n$ | no conflicting transactions to different proposers |
| $\alpha$ | min age of tx (in blocks) | 1 | lower commit-time in case of faulty proposers |
| $\beta$ | block size | $1 \leq \beta \leq 10,000$ | block size impacts network delay |
| $\delta$ | max time between proposals | few seconds | slightly longer than consensus |
| $\rho$ | set of proposers | $t + 1 \leq |\rho| \leq n$ | fewer (resp. more) proposers commits faster (resp. more) |
| $\tau$ | transaction signature | ECDSA | smaller keys and signatures than RSA for similar security level |

Leader-based (CONS1) and randomized BFT (HBBFT): The algorithm CONS1 is an implementation of the three step coordinator based message pattern used by PBFT, Tendermint and BFT-SMaRT which is used in the Byzantine Fault Tolerant version of Hyperledger. To reduce network consumption CONS1 was implemented using digests in messages that follow the initial broadcast. Both CONS1 and HBBFT variants use a classic verification process that, as in traditional blockchain systems, takes place at every decider upon delivery of the decided block from consensus. Unless otherwise stated, all nodes behave correctly.

Apart from the sharded verification process, all algorithms were set to run the same code for the state-machine component implementing the blockchain. Note that there exist BFT algorithms that terminate in less message steps than CONS1, but require additional assumptions like non-faulty clients, or t<n/5. HBBFT uses a randomized consensus and reliable broadcast via erasure codes.

Machine specification: The evaluation was performed on 14 Amazon datacenters including: North Virginia, Ohio, North California, Oregon, Canada, Ireland, Frankfurt, London, Paris, Tokyo, Seoul, Singapore, Sydney, Mumbai, São Paulo. Two different VMs were tested including: (1) high-end c4.8xlarge instances with an Intel Xeon E5-2666 v3 processor of 18 hyperthreaded cores, 60 GiB RAM and 10 Gbps network performance when run in the same datacenter where storage is backed by Amazon's Elastic Block Store (EBS) with 4 Gbps dedicated throughput; and (2) low-end c4.xlarge instances with an Intel Xeon E5-2666 v3 processor of 4 vCPUs, 7.5 GiB RAM, and "moderate" network performance (as defined by Amazon). Storage is backed by EBS with 750 Mbps dedicated throughput. To limit the bottleneck effect on the leader of PBFT, the leader was placed in the most central region with respect to latency, which was Oregon. When not specified, proposals contain 10,000 transactions and t is set to the larger integer strictly lower than n/3.

Evaluation 1: Comparing Geo-Distributed Blockchains

First, the performance was considered when running 10 high-end VMs in each of the 14 regions for a total of 140 machines. Each region contains 10 high-end machines. As depicted in the table of FIG. 9, the variation of communication latencies was computed, and the throughput between these Amazon EC2 datacenters was measured using c4.xlarge instances. The minimum latency was 11 ms between London and Ireland, whereas the maximum latency was 332 ms between Sydney and São Paulo. Bandwidth between Ohio and Singapore was measured at approximately 64.9 Mbits/s (with variance between 6.5 Mbits/s and 20.4 Mbits/s).

Impact of Verification

Figure 10:
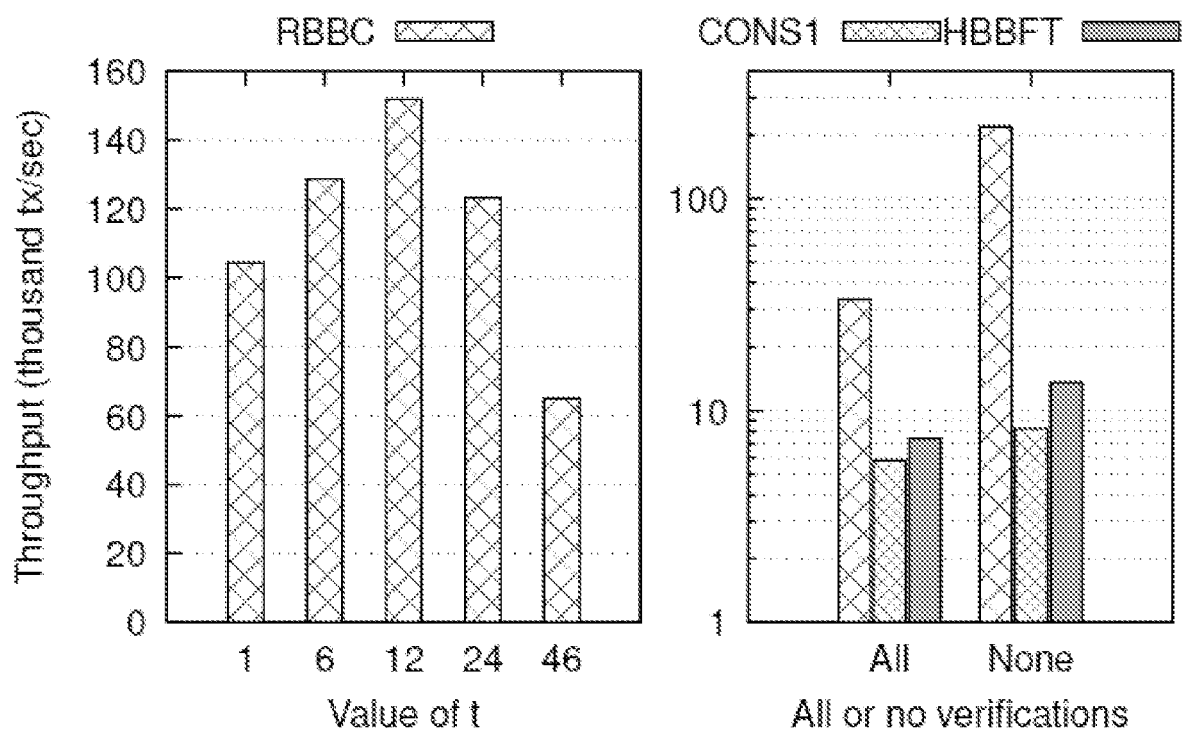
FIG. 10 is a set of graphs showing the results of an experimental evaluation of the impact of fault tolerance and verification on the throughput of the blockchain system.

To measure the impact of verification on performance, the parameter t was varied from the minimum to its maximum value (46<140/3) with sharded verification performed. FIG. 10 shows the impact of fault tolerance and verification on the RBBC throughput when n=140 geo-distributed machines. As depicted in FIG. 10 (left) a comparison was performed between all three blockchains with all nodes verifying all transactions (all), and with no verification (no validation) as depicted in FIG. 10 (right). The peak throughput of 151,000 transactions per second (tx/sec) is achieved with the fault-tolerance parameter t=12. When t≤6, performance is limited by the $(t-1)^{th}$ slowest node as the consensus waits for a higher number of n-t proposers. When t>24, performance is then limited by the growing number of t+1 necessary verifications. On the other graph, the performance of all algorithms is observed to be higher without verification than with full verification. RBBC is the most affected dropping from 219,000 tx/sec to 33,000 tx/sec while HBBFT and CONS1 throughputs drop less but from a lower peak. However, there are factors other than verification that have a larger impact on these algorithms (as illustrated by other experiments described herein).

Combining Proposals

Figure 11:
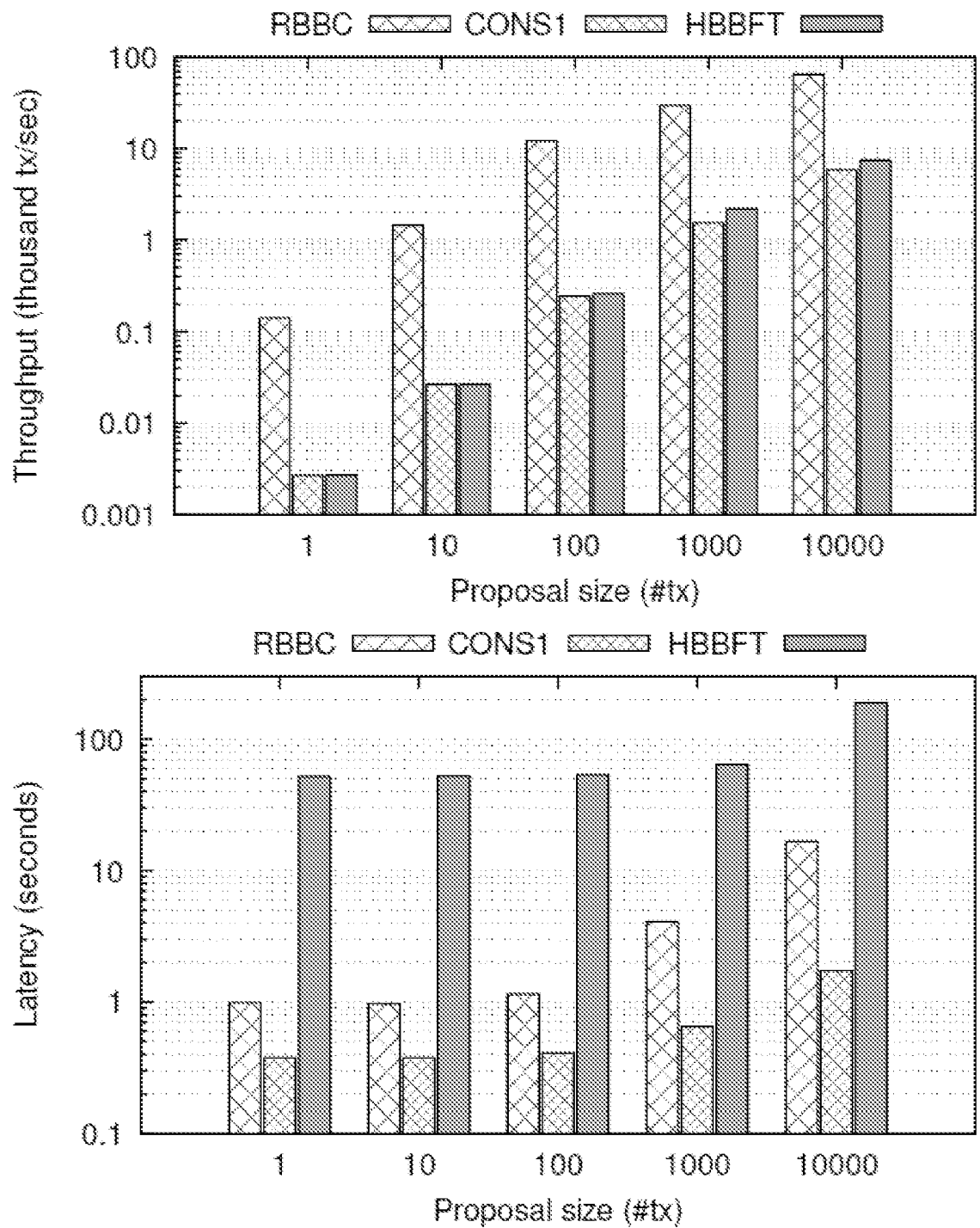
FIG. 11 is a set of graphs showing the results of an experimental evaluation of throughput and latency parameters of the blockchain system.

FIG. 11 depicts the effect of deciding the unions of proposals when running the blockchain. Specifically, the throughput and latency of the blockchain solutions was compared with n=140 and t=46, and proposal sizes of 1, 10, 100, 1000 and 10000. CONS1 has the lowest latency because in all executions the leader acts correctly, allowing it to terminate in only 3 message delays, where RBBC with DBFT requires 4 message delays. RBBC is observed to offer the best latency/throughput trade-off: at 1000 ms latency, RBBC offers 12,100 tx/sec whereas at 1750 ms latency, CONS1 offers only 5800 tx/sec. Finally, the blockchain with HBBFT has the worst performance for several reasons: i) HBBFT relies on a consensus algorithm whose termination is randomized; and ii) it uses erasure codes such that the computation time needed for performing reliable broadcast on a single node with a proposal size of 1000 transactions takes over 200 ms. Each node then has to conduct this process for each proposal (i.e. 140 times in this experiment) increasing significantly the latency.

Low-End Machines and Distributed Proposals

Experiments were performed on up to 240 low-end VMs, each of which having computing hardware similar to a cell phone, and evenly spread on 5 datacenters in the United States (Oregon, Northern California, and Ohio) and Europe (Ireland and Frankfurt). The experiment examined the impact of having t+1 vs n proposer nodes. Dedicating the 4 vCPUs of these low-end instances led to verify about 7800 serialized transactions per second with 97% of CPU time spent verifying signatures with 3% spent deserializing and updating the UTXO table.

Figure 12:
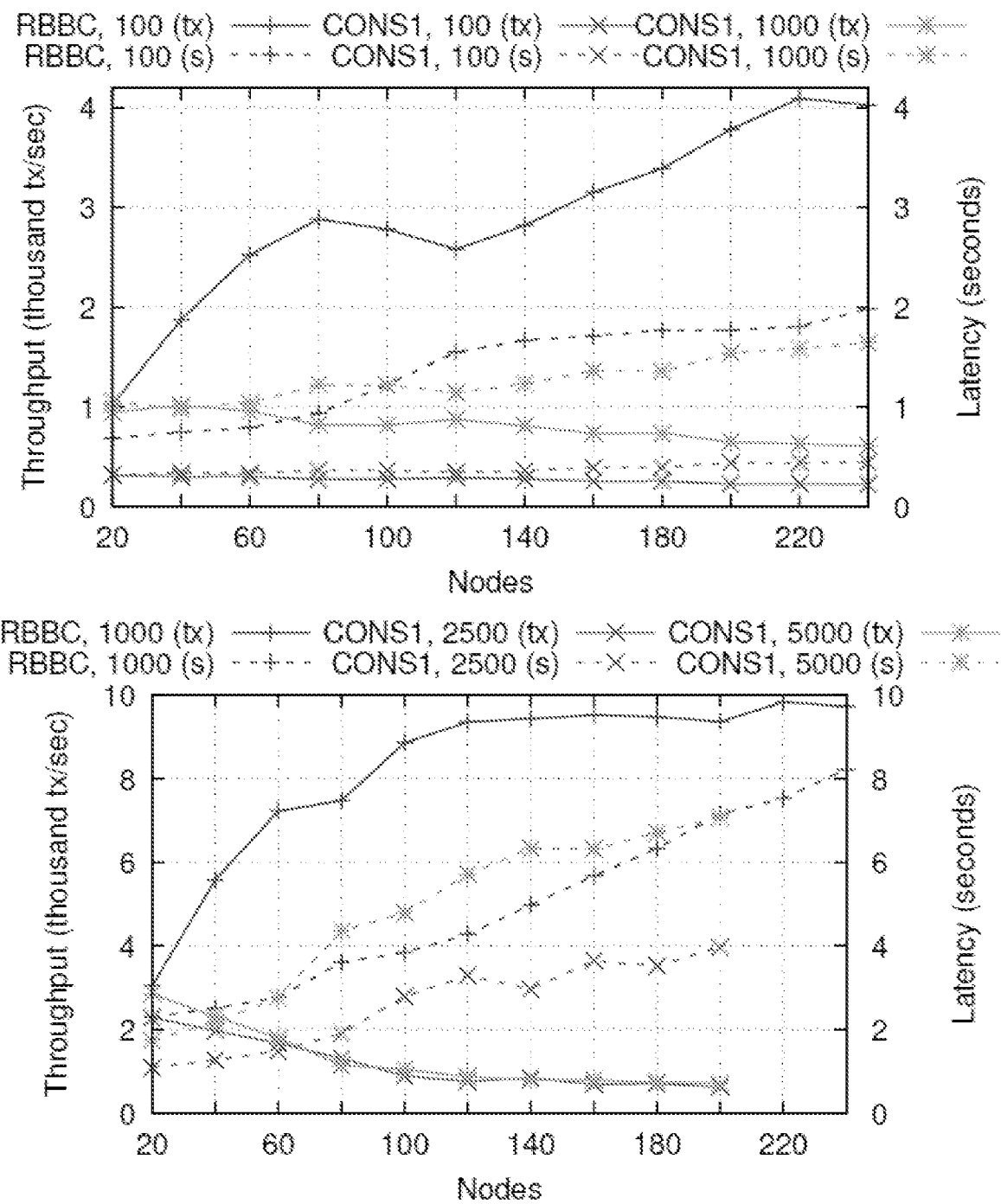
FIG. 12 is a set of graphs showing the results of an experimental evaluation that compared the throughput performance of the blockchain system to another system for t+1 proposer nodes.

FIG. 12 shows the throughput and latency of RBBC with t+1 proposers and CONS1 with different sizes of proposals. In FIG. 12, the number following the algorithm name represents the number of transactions in the proposals, solid lines represent throughput, and dashed lines represent latency. As CONS1 is limited to a single proposer (its leader) while RBBC supports multiple proposers, the experiment aimed to test whether CONS1 performance would be better with more transactions per proposal than RBBC.

With a proposal size of 100, RBBC throughput increases from 1000 to 4000 tx/sec while its latency increases from 750 ms to 2 seconds. The throughput increase stems from increasing CPU and bandwidth resources with more proposers. With a larger proposal size (1000), performance increases faster (from 3000 tx/sec to 9000 tx/sec) with the number of nodes and flattens out earlier around 10,000 tx/sec while latency increases from 2 to 8 seconds.

With a proposal size of 100, CONS1 throughput decreases from 310 tx/sec to 220 tx/sec while latency increases from 320 ms to 460 ms. However, it appears that this low latency does not help to increase throughput by increasing proposal size after a certain number of nodes. In particular, with a proposal size of 5000 the throughput drops by 4 times (from 2800 tx/sec to 700 tx/sec). While CONS1 can broadcast message authentication codes (MACs) through UDP in local area networks, no such broadcast primitive is available in this wide area testnet.

Figure 13:
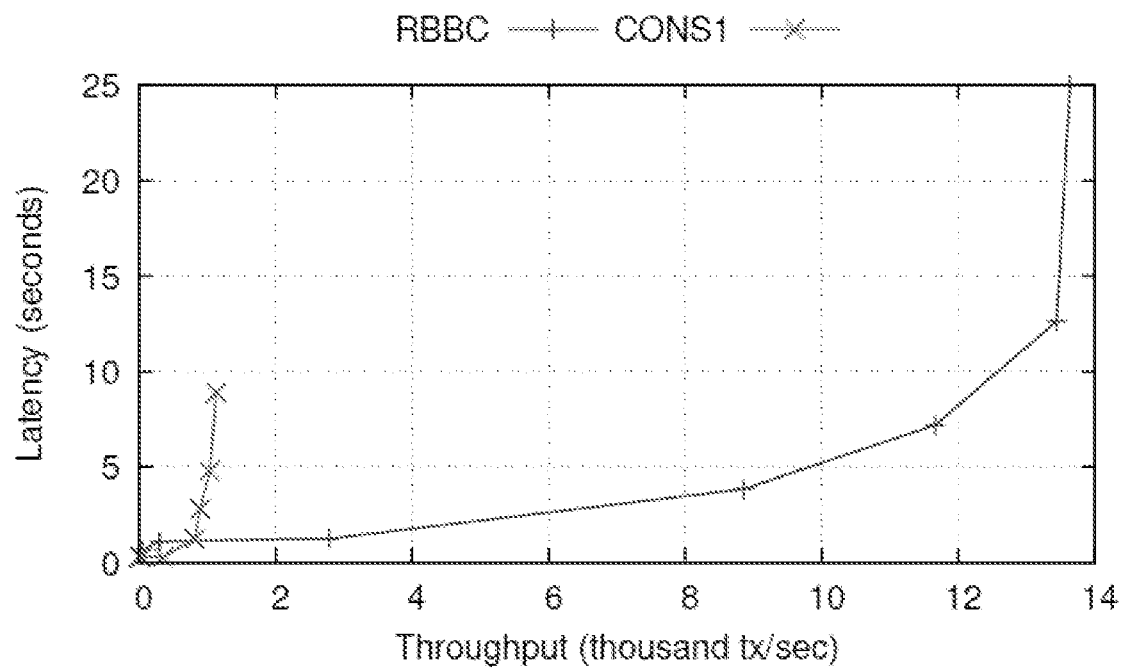
FIG. 13 is a graph showing the results of an experimental evaluation that compared the latency performance of the blockchain system to another system for t+1 proposer nodes.

FIG. 13 further examines the performance of CONS1 and RBBC with 100 nodes and proposal sizes of 1, 10, 100, 1000, 2500, and 5000. It is observed that the throughput of CONS1 reaches a limit of about 1100 tx/sec, while RBBC approaches 14,000 tx/sec. CONS1 appears to have a better minimum latency of 270 ms compared to 640 ms for RBBC for proposals of size 1.

Figure 14:
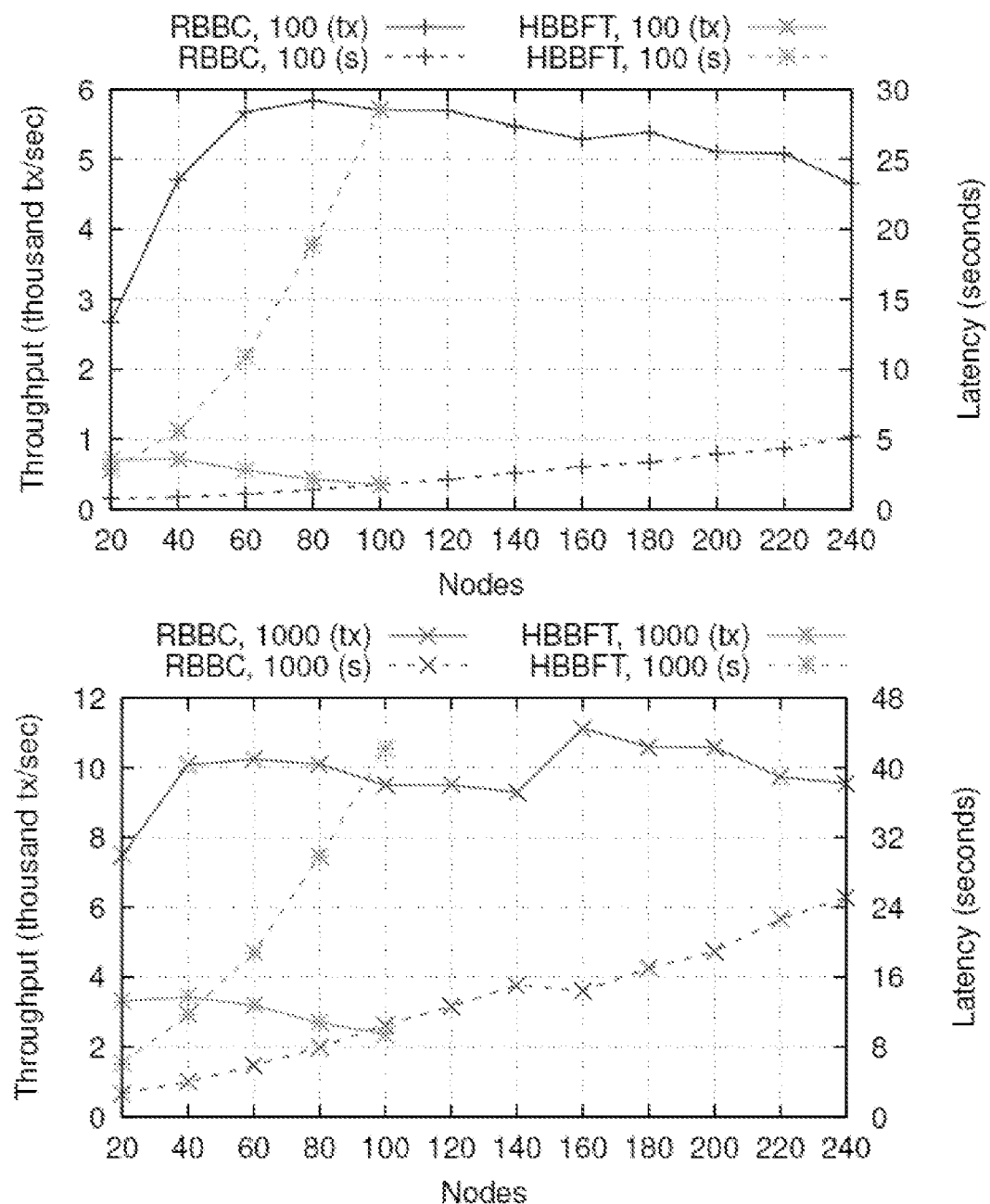
FIG. 14 is a set of graphs showing the results of an experimental evaluation that compared the throughput and latency performance of the blockchain system to another system for n proposer nodes and a varying number of proposed transactions.

FIG. 14 depicts the performance of RBBC and HBBFT with n proposer nodes, with proposal sizes of 100 and 1000 transactions (where the number following the algorithm name represents the number of transactions in the proposals, the solid lines represent throughput, dashed lines represent latency). It is observed that, the throughput of RBBC increases faster with n proposers compared to t+1 proposers. With a proposal size of 100, the throughput reaches 6000 tx/sec at 80 nodes and slowly degrades, while latency starts at 740 ms with 20 nodes and reaches 5160 ms with 240 nodes. With a proposal size of 1000, the throughput reaches 10,000 tx/sec at 40 nodes and remains mostly flat, while the latency starts at 2670 ms with 20 nodes and reaches 25,100 ms with 240 nodes. With larger node counts (i.e. around 200), the configurations with t+1 proposers achieve similar throughput, but with much lower latency. Thus when using nodes similar to the low-end instances, having n proposers seems to be better suited for configurations of less than 100 nodes.

For HBBFT it is observed that latencies increase super-linearly and throughput degrades as the number of nodes is increased. As previously discussed, this is primarily due to the computation needed for the erasure codes. Note that HBBFT is only run on up to 100 nodes as for larger values latencies of >60 s are observed.

Figure 15:
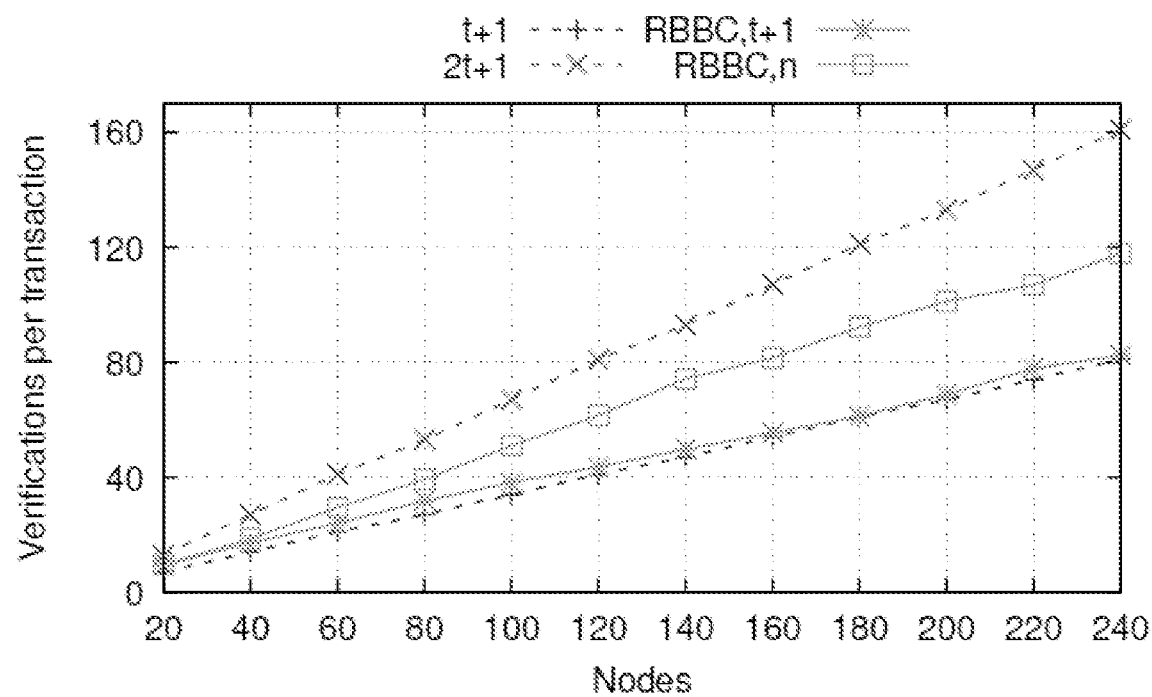
FIG. 15 is a graph showing the results of an experimental evaluation that evaluated the number of times a transaction is verified by the blockchain system with a proposal size of 100 transactions.

In the previous experiments, the average number of times a transaction is verified was also recorded in order to examine the state of sharded verification. The results are shown in FIG. 15, which shows the number of times a transaction is verified in RBBC with proposal size of 100 transactions, and with either t+1 or n proposer nodes (the dashed lines t+1 and 2t+1 represent the minimum and maximum number of possible verifications). The best case is t+1 verifications while the 2t+1 is the worst case. It is observed that with t+1 proposers the number of verifications stays close to the optimal, while with n proposers the number of verifications remains around the middle of t+1 and 2t+1. This is likely due to the increased load on the system causing verifications to occur in different orders at different nodes.

Byzantine Attacks

The performance of RBBC was evaluated under 2 Byzantine attacks Byz1 and Byz2. In Byz1 the payload of the reliable broadcast messages is altered so that no proposal is delivered for reliable broadcast instances led by faulty nodes. The binary payloads of the binary consensus messages are flipped. The goal of this behavior is to reduce throughput and increase latency.

In Byz2 the Byzantine nodes form a coalition in order to maximize the bandwidth cost of the reliable broadcast using the digests, as described above. As a result, for any reliable broadcast initiated by a Byzantine node, t+1 correct nodes will deliver the full message while the remaining t will only deliver the digest of the message, meaning they will have to request the full message from t+1 different nodes from whom they receive echo messages.

Figure 16:
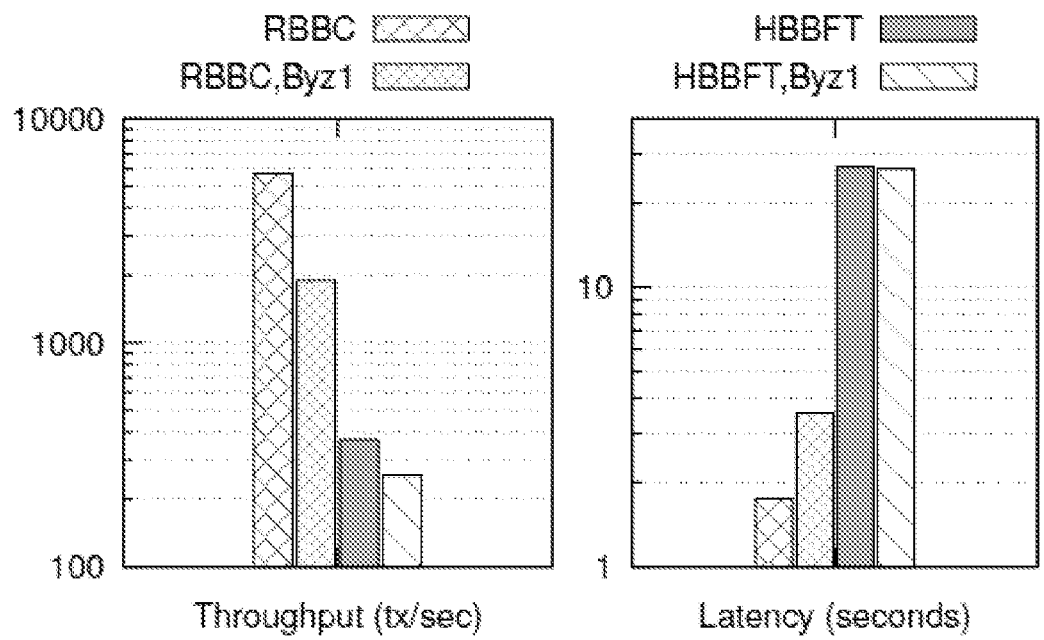
FIG. 16 is a set of graphs showing the results of an experimental evaluation that compared the throughput and latency performance of the blockchain system to another system for conditions of normal operation and a first Byzantine behaviour.

Experiments were run with 100 low-end machines using the same 5 datacenters from US and Europe and with n proposers. FIG. 16 shows the throughput and latency of RBBC and HBBFT, with normal and Byzantine behaviour (Byz1) on 100 geo-distributed nodes, where all n nodes are making proposals of 100 transactions. For RBBC, throughput drops from 5700 tx/sec to 1900 tx/sec, and latency increases from 920 ms to 1750 ms. The drop in throughput is partially due to having t less proposals being accepted (the proposals sent by Byzantine nodes are invalid), and due to the increase in latency. The increase in latency is due to the extra rounds needed to be executed by the binary consensus to terminate with 0. The throughput of HBBFT drops from 350 to 256 tx/sec due to the decrease in proposals. However, the latency is also observed to decrease. This is likely due to the fact that, since there are fewer proposals, less computation is needed for the erasure codes.

Figure 17:
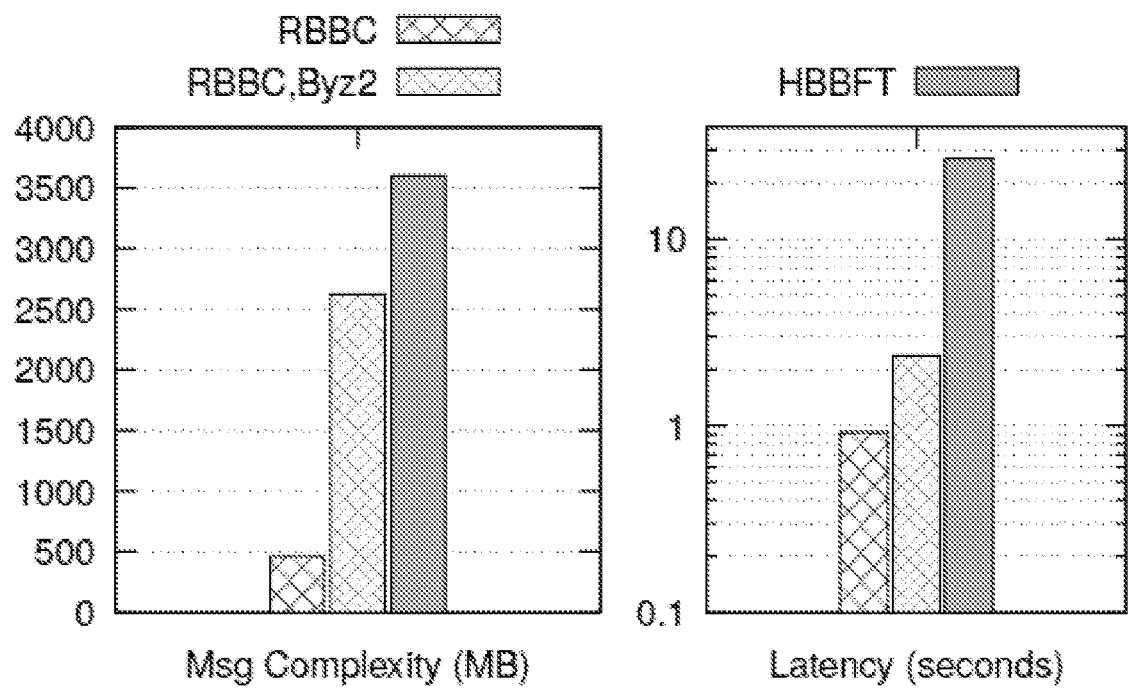
FIG. 17 is a set of graphs showing the results of an experimental evaluation that compared the throughput and latency performance of the blockchain system to another system for conditions of normal operation and a second Byzantine behaviour.

Byz2 is designed against the digest based reliable broadcast implementation, as described above, with the goal of delaying the delivery of the message to t of the correct nodes, and increasing the bandwidth used. HBBFT avoids this problem by using erasure codes, but has a higher bandwidth usage is the non-faulty case. FIG. 17 shows the impact of this behavior on bandwidth usage and latency for RBBC and HBBFT by comparing message complexity and latency of with normal and Byzantine (Byz2) behaviors with n proposers and proposal sizes of 100. The bandwidth usage of RBBC increases from 538 MB per consensus instance to 2622 MB per consensus instance compared to HBBFT which uses 3600 MB in all cases. Furthermore, the latency of RBBC increases from 920 ms to 2300 ms. Note that the bandwidth usage can further increase if additional delays are added to the network, in such cases the use of erasure codes becomes beneficial.

Single Datacenter

Figure 18:
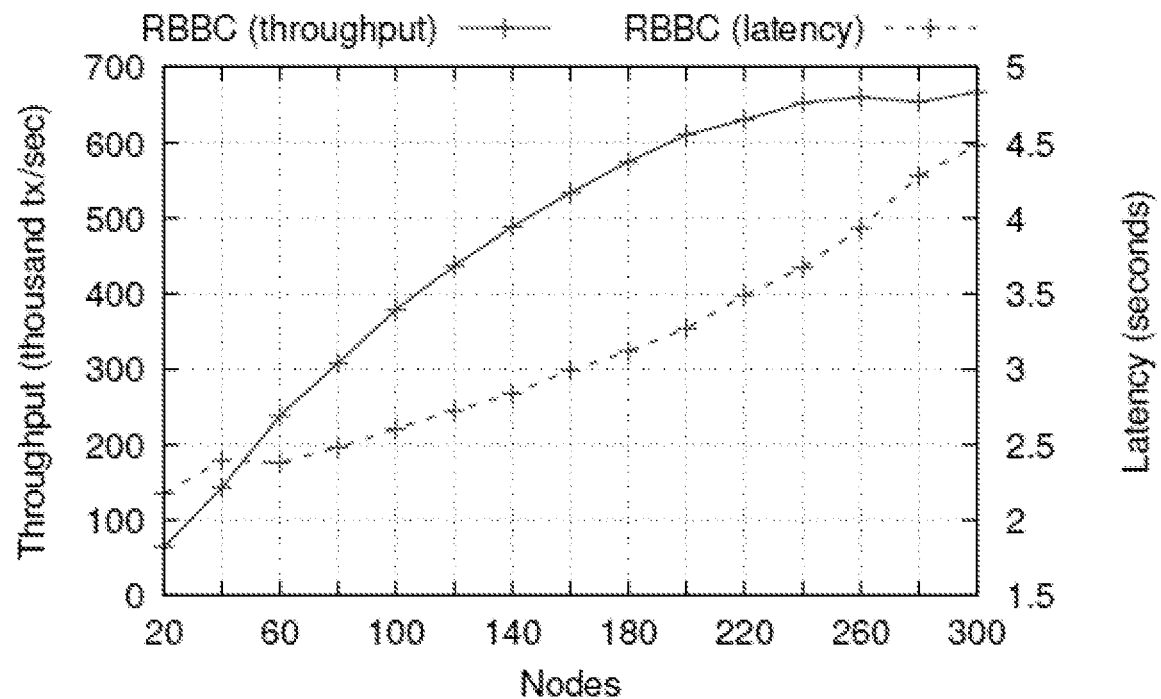
FIG. 18 is a graph showing the results of an experimental evaluation that evaluated the throughput and latency performance of the blockchain system operating on a single datacentre.

A stress test was performed in which the RBBC was evaluated on 300 high-end VMs in the Oregon datacenter. The value of t was fixed to the largest fault tolerance parameter that is tolerable by the system with the number of nodes set to n=20 nodes initially and increased from 20 to 300. This progressive increase helps identify potential performance bottlenecks. The results, shown in FIG. 18, indicate that the throughput scales up to n=260 nodes to reach 660,000 tx/sec while the latency remains lower than 4 seconds. At n=280 throughput drops slightly. Other experiments, which are not presented herein, indicated about 8 verifications per transaction converging towards 7=t+1 as n increases. The performance is thus explained by the fact that the system is CPU-bound up to n=260, so that increasing n adds CPU resources which are needed for the sharded verification and improves performance. Further increases cause the system to become network-bound due to the consensus protocol and performance flattens out.

Impact of Remote Requesters

For the following described experiments the Blockchain was run with requesters defined as follows. At the start of the benchmark each requester is assigned a random private key and a single UTXO contained within the genesis block with value 100,000 coins. The requester then loops over the following two steps until the following steps are performed:
(i) For each UTXO currently assigned to the requester, a new transaction is created using that UTXO as input. For the transaction's output a UTXO is created using a randomly chosen account as the receiver with a value of 10 coins. Any change is included in a second UTXO sent back to the requester. Each transaction is then broadcast to the requester's assigned proposers.
(ii) The requester then repeatably performs the request_utxos(account) operation until it receives at least one new UTXO and then returns to step (i). Each requester is run in its own thread and maintains connections to 2t+1 of the blockchain nodes, including the requester's t+1 proposers (all CONS1 requesters have the same primary proposer).

RBBC and CONS1 were performed using 100 c4.4xLarge server instances and 25 c4.4xLarge requester instances. Both types of nodes are evenly distributed across the 5 datacenters from US and Europe. The c4.4xLarge instances use Intel Xeon E5-2666 v3 processors with 16 vCPUs, and 30 GiB RAM. The number of requesters was varied from 1,000 to 50,000 with an even distribution across the requester nodes. The proposal size $\beta$ was set to 1000 for RBBFT as it gives the best throughput. For CONS1 the proposal size is set to 2500 as larger sizes tend to increase latency without increasing throughput, while smaller sizes decrease throughput while only having a minor impact on latency. The experiments were run for 45 sec with a 15 sec warmup.

Table 3 shows the performance of RBBFT and CONS1 with a varying number of requesters. Valid-tx/sec is average number of valid transactions committed per second, Read/sec is the average number of request_utxos(account) operations performed per second, R/W ratio is the ratio of the previous two values, Latency is the average amount of time between committed blocks, Valid-tx/block is the average number of valid transactions per block, and Invalid-tx/block is the average number of invalid transactions per block.

Similarly to the previous experiments, it is observed that RBBFT has the highest maximum throughput of 14,450 tx/sec compared to 4,064 with CONS1. RBBFT has the highest maximum latency between blocks of 5,022 milliseconds compared to a maximum of 625 milliseconds for CONS1. The higher throughput and latency is explained by the higher utilization of resources by the sharded proposers and reduced computation needed for sharded verification. In RBBFT, increasing the number of clients past 10,000 has little impact on the throughput as the system resources are already saturated by this point, as a result an increase in the R/W ratio is observed as it takes longer for each individual node's transaction to complete. A similar pattern is shown by CONS1, though this starts at 1,000 clients as they are limited by the single primary proposer. Furthermore in RBBFT, increasing the number of clients also increases the number of duplicate transactions occurring in blocks. This is due to the increased load in the system causing slower nodes to miss their proposals, thereby resulting in transactions being committed by secondary proposers.

TABLE 3

Performance of RBBFT and CONS1 with varying number of requesters.

|  | #Requesters | Valid-tx/sec | Read/sec | R/W ratio | Latency (ms) | Valid-tx/block | In-valid-tx/block |
|---|---|---|---|---|---|---|---|
| RBBFT | 1,000 | 5,359 | 2,143 | 0.4 | 870 | 4,648 | 0 |
|  | 10,000 | 13,870 | 33,288 | 2.4 | 2,475 | 34,132 | 877 |
|  | 20,000 | 12,664 | 31,660 | 2.5 | 5,022 | 63,607 | 3,033 |
|  | 50,000 | 14,450 | 47,685 | 3.3 | 4,303 | 62,193 | 5,455 |
| CONS1 | 1,000 | 3,759 | 1,127 | 0.3 | 401 | 1,513 | 0 |
|  | 10,000 | 3,309 | 6,278 | 1.9 | 359 | 1,172 | 0 |
|  | 20,000 | 4,064 | 10,566 | 2.6 | 488 | 1,981 | 0 |
|  | 50,000 | 4,035 | 12,509 | 3.1 | 625 | 2,500 | 0 |

Evaluation 2: Execution with 1000 VMs

To confirm that the RBBC blockchain scales to a large number of machines, an evaluation was conducted on 1000 VMs. To avoid wasting bandwidth, the roles were segregated such that all 1000 VMs act as servers and keep a local copy of the balances of all accounts. On these replicas, 10 clients per 840 c4.large machines (60 VMs in each of 14 datacenters) send transactions and 160 c4.8xlarge machines (40 machines in each of the Ireland, London, Ohio and Oregon datacenters) decide upon each block. Each of the 8400 clients start with 100 UTXOs and each proposal contains up to 1000 transactions. Performance is depicted in Table 4. It is observed that throughput is around 30,000 tx/sec, which is likely due to the difficulty of generating the workload (since the replicas are located in 15 different datacenters and have to wait for a UTXO to request a transaction that consumes it). The asynchronous write latency measures the time a proposer acknowledges a transaction reception. The transaction commit time (latency) remains about 3 seconds despite the large traffic.

TABLE 4

Performance of RBBFT with 1000 servers spread in 15 data centers.

| # Replicas | #Requesters | Valid-tx/sec | Async write latency(ms) | Latency (ms) | Valid-tx/block | Invalid-tx/block |
|---|---|---|---|---|---|---|
| 1000 | 8,400 | 30,684 | 238 | 3,103 | 95,407 | 378 |

Many modifications will be apparent to those skilled in the art without departing from the scope of the present invention.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A blockchain process executed by a proposer computing node, including the steps of:

generating proposed transaction data representing a set of proposed transactions from a group of transactions, where the proposed transactions are distinct from the proposed transactions of one or more other proposer nodes;

transmitting the proposed transaction data to a predetermined number of associated verifier computing nodes to verify each of the proposed transactions;

receiving, from at least one of the predetermined number of verifier computing nodes, verification data indicating a verification result of each proposed transaction; and generating block data to include one or more transactions of the group in a blockchain data structure, the included transactions being verified ones of: the proposed transaction set of the proposer computing node; and the respective other proposed transaction sets of the other proposer nodes, wherein the generation of at least the proposed transaction data, and the block data, is performed according to a Democratic Byzantine Fault Tolerant (DBFT) protocol, such that the block data represents a decided transaction block that is determined by combining the proposed sets of transactions of all proposer nodes in a network.

2. The process of claim 1, wherein the predetermined number of verifier computing nodes is at least t+1 and at most 2t+1, where t is the maximum number of faulty nodes in the network.

3. The process of claim 2, wherein the associated verifier computing nodes are determined dynamically based on the transactions to be processed by the network.

4. The process of claim 2, wherein the associated verifier computing nodes include a set of t+1 primary verifier nodes and a set of up to t secondary verifier nodes, the secondary verifier nodes providing redundancy against the failure of one or more of the verifier nodes.

5. The process of claim 4, wherein the set of secondary verifier computing nodes is disjoint from the one or more of the verifier nodes, and includes at least t nodes.

6. The process of claim 1, wherein the generation of the block data includes receiving, at the proposer node, data representing the verified transactions of the proposed transaction sets of each other proposer node in the network.

7. The process of claim 6, wherein the proposer node broadcasts data representing the verified transactions of its proposed transaction set to each other proposer node in the network.

8. The process of claim 1, wherein the verification of each proposed transaction involves checking a digital signature of the corresponding transaction data.

9. The process of claim 8, wherein the process of checking the digital signature of the transaction includes:

extracting an encrypted representation of the digital signature; decrypting the representation to obtain a signature hash value; and comparing the signature hash value to a hash value calculated based on the transaction data.

10. The process of claim 1, wherein the proposer nodes are selected based, at least in part, on the geo-location of the node such that particular proposer nodes are likely to receive different sets of transactions from corresponding geo-regions.

11. The process of claim 1, wherein the decided transaction block includes transaction data representing a union of all verified transactions across all proposer nodes in the network.

12. The process of claim 1, wherein the DBFT is a weak co-ordinator based BFT protocol.

13. The process of claim 1, wherein the transactions are financial transactions, and the included transactions represented by the block data are valid transactions, the validity of each transaction being determined by a reconciliation process.

14. The process of claim 13, wherein the reconciliation process determines the validity of a financial transaction by checking whether the transaction is executable.

15. A blockchain system, including:
a plurality of computing nodes, each configured to act as at least one of a proposer node and a verifier node, and each of the computing nodes including:
at least one network interface to receive data from a communications network;
at least one processor; and
a memory coupled to the at least one computer processor and storing instructions that, when executed by the at least one processor, cause the at least one computer processor to execute a blockchain process, wherein, if at least one node of the plurality of computing nodes is configured to act as the proposer node, the blockchain process includes the steps of:
generating proposed transaction data representing a set of proposed transactions from a group of transactions, where the proposed transactions are distinct from the proposed transactions of one or more other proposer nodes of the system;
transmitting the proposed transaction data to a predetermined number of associated verifier nodes of the system for verification of each proposed transaction;
receiving, from at least one of the predetermined number of verifier computing nodes, verification data indicating a verification result of each proposed transaction; and
generating block data to include one or more transactions of the group in a blockchain data structure, the included transactions being the verified ones of: the proposed transaction set of the proposer node; and respective other proposed transaction sets of the other proposer nodes; and
wherein, if at least one node of the plurality of computing nodes is configured to act as the verifier node, the blockchain process includes the steps of:
receiving, from a proposer node of the blockchain system, proposed transaction data representing a set of proposed transactions from a group of transactions, the proposed transactions being distinct from the proposed transactions of one or more other proposer nodes of the blockchain system;
generating verification data indicating a verification result of each proposed transaction;
transmitting the verification data to one or more associated nodes of the blockchain system, the associated nodes including the proposer node from which the proposed transaction data was received; and
generating block data to include one or more transactions of the group in a blockchain data structure, the included transactions being the verified ones of: the proposed transactions of the proposer node; and respective other proposed transactions of the other proposer nodes,
where the other proposed transactions are verified by nodes of the system other than the node and the one or more associated nodes,
wherein the generation of at least the proposed transaction data, and the block data, is performed according to a Democratic Byzantine Fault Tolerant (DBFT) protocol, such that the block data represents a decided transaction block that is determined by combining the proposed sets of transactions of all proposer nodes in the communications network.

16. The blockchain system of claim 15, wherein at least one of the plurality of computing nodes acts as the proposer node.

17. The blockchain system of claim 15, wherein at least one of the plurality of computing nodes acts as the verifier node.

18. The blockchain system of claim 15, wherein at least one of the plurality of computing nodes acts as the proposer node and the verifier node.

19. A non-transitory computer-readable storage medium having stored thereon instructions that, when executed by at least one processor of a computing system, cause the at least one processor to execute the process including the steps of:
generating proposed transaction data representing a set of proposed transactions from a group of transactions, where the proposed transactions are distinct from the proposed transactions of one or more other proposer nodes;
transmitting the proposed transaction data to a predetermined number of associated verifier computing nodes to verify each of the proposed transactions;
receiving, from at least one of the predetermined number of verifier computing nodes, verification data indicating a verification result of each proposed transaction; and
generating block data to include one or more transactions of the group in a blockchain data structure, the included transactions being verified ones of: the proposed transaction set of the proposer computing node; and the respective other proposed transaction sets of the other proposer nodes,
wherein the generation of at least the proposed transaction data, and the block data, is performed according to a Democratic Byzantine Fault Tolerant (DBFT) protocol, such that the block data represents a decided transaction block that is determined by combining the proposed sets of transactions of all proposer nodes in a network.

* * * * *